(12) United States Patent
Xu et al.

(10) Patent No.: US 11,734,343 B1
(45) Date of Patent: Aug. 22, 2023

(54) HYPERZOOM ATTRIBUTE ANALYTICS ON THE EDGE

(71) Applicant: Verkada Inc., San Mateo, CA (US)

(72) Inventors: Yi Xu, Belmont, CA (US); Mayank Gupta, Foster City, CA (US); Xia Yang, San Jose, CA (US); Yuanyuan Chen, San Mateo, CA (US); Zixiao (Shawn) Wang, San Mateo, CA (US); Qiang (Kevin) Fu, Sunnyvale, CA (US); Yunchao Gong, Los Altos, CA (US); Naresh Nagabushan, San Mateo, CA (US)

(73) Assignee: Verkada Inc., San Mateo, CA (US)

( * ) Notice: Subject to any disclaimer, the term of this patent is extended or adjusted under 35 U.S.C. 154(b) by 0 days.

(21) Appl. No.: 18/155,687

(22) Filed: Jan. 17, 2023

Related U.S. Application Data

(63) Continuation of application No. 17/869,164, filed on Jul. 20, 2022, now Pat. No. 11,586,667, which is a
(Continued)

(51) Int. Cl.
*G06K 9/00* (2022.01)
*G06F 16/583* (2019.01)
(Continued)

(52) U.S. Cl.
CPC ........ *G06F 16/5838* (2019.01); *G06F 16/532* (2019.01); *G06F 16/538* (2019.01);
(Continued)

(58) Field of Classification Search
CPC .. G06F 16/5838; G06F 16/532; G06F 16/538; G06V 10/26; G06V 10/56; G06V 10/82
See application file for complete search history.

(56) References Cited

U.S. PATENT DOCUMENTS 6,442,573 B1    8/2002    Schiller et al.
8,854,395 B2    10/2014    Ptucha et al.
(Continued)

OTHER PUBLICATIONS

Zhang, Yifu , et al., "ByteTrack: Multi-Object Tracking by Associating Every Detection Box", Huazhong University of Science and Technology; The University of Hong Kong; ByteDance; arXiv:2110.06864v2 [cs.CV].

*Primary Examiner* — Duy M Dang
(74) *Attorney, Agent, or Firm* — Perkins Coie LLP; Michael A. Glenn

(57) ABSTRACT

A computer vision processor of a camera extracts attributes of persons or vehicles from hyperzooms generated from image frames. The hyperzooms represent traffic patterns. The extracting is performed using a feature extractor of an on-camera convolutional neural network (CNN) including an inverted residual structure. The attributes include at least colors of clothing of the persons or colors of the vehicles. Mobile semantic segmentation models of the CNN are generated using the hyperzooms and the attributes. Attribute analytics are generated by executing the mobile semantic segmentation models while obviating network usage by the camera. The attribute analytics are stored in a key-value database located on a memory card of the camera. A query is received from the server instance specifying one or more of the attributes. The attribute analytics are filtered using the one or more of the attributes to obtain a portion of the traffic patterns.

20 Claims, 13 Drawing Sheets

Related U.S. Application Data continuation of application No. 17/700,396, filed on Mar. 21, 2022, now Pat. No. 11,429,664.

(51) Int. Cl.
  *G06F 16/538* (2019.01)
  *G06V 10/82* (2022.01)
  *G06V 10/26* (2022.01)
  *G06F 16/532* (2019.01)
  *G06V 10/56* (2022.01)

(52) U.S. Cl.
  CPC .............. *G06V 10/26* (2022.01); *G06V 10/56* (2022.01); *G06V 10/82* (2022.01)

(56) References Cited

U.S. PATENT DOCUMENTS

| | | |
|---|---|---|
| 10,372,991 B1 | 8/2019 | Niemasik et al. |
| 11,025,865 B1 | 6/2021 | Medasani et al. |
| 11,034,363 B2 | 6/2021 | Choi et al. |
| 11,429,664 B1 | 8/2022 | Xu et al. |
| 2016/0063611 A1 | 3/2016 | Davis et al. |
| 2016/0297478 A1 | 10/2016 | Inoue et al. |
| 2017/0132922 A1* | 5/2017 | Gupta .................... H04L 67/12 |
| 2017/0195561 A1 | 7/2017 | Hegelich et al. |
| 2018/0204331 A1 | 7/2018 | Omari et al. |
| 2019/0155285 A1 | 5/2019 | Wang |
| 2019/0251364 A1 | 8/2019 | Park et al. |
| 2019/0293670 A1 | 9/2019 | Mueller |
| 2021/0326599 A1 | 10/2021 | Jain et al. |

* cited by examiner

```
PUT https://vsubmit.command.machine.com/submit/object_tracking_hyperzoom
/<object_id>
Headers:
    X-Machine-Auth: security_token
    Content-Type: image/jpeg
    X-Machine-Extra: {}
Body: binary data representing the image
```

FIG. 2A

| Start Time | Count 14400 | Count 3600 | Count 900 | Count 300 |
|---|---|---|---|---|
| <Start Time. A multiple of min increment> | <Counts/IDs in the past 4 hours. Optional> | <Counts/IDs in the past hour. Optional> | <Counts/IDs in the past 15 min. Optional> | <Counts/IDs in the past 5 min. Required> |

FIG. 2B

Analytics

Analytics Terms and Conditions agreed to by _____ on July 21, 2021.

High Resolution Analytics Capture

Enabling this will allow People History and Vehicle History to be turned on for an individual camera in its settings page.

Face Matching & Search

Enabling this will allow Face Matching & Search to be turned on for an individual camera in its settings page. Face Matching & Search requires High Resolution Analytics Capture to be enabled.

Person of Interest Notifications BETA

Enabling this allows users to turn on Person of Interest notifications on the Events page. Person of Interest Notifications requires both High Resolution Analytics Capture and Face Matching & Search to be enabled.

Person of Interest Notifications is a Beta feature and should not be used for mission critical applications.

*FIG. 4*

General

Device

Events

Privacy

Analytics

Backup

Analytics

Analytics Terms and Conditions agreed to by _____ on July 21, 2021.

⬤ High Resolution Image Capture

Enabling this feature will require a firmware update and consume additional bandwidth on the network.

◯ Face Detection

Requires High Resolution Image Capture to be enabled.

◯ Person Attributes

Requires High Resolution Image Capture to be enabled as it captures physical attributes like appearance and clothing color.

◯ Vehicle Analytics

Vehicle Analytics requires High Resolution Image Capture to be enabled.

*FIG. 5*

1104 Extract, by a computer vision processor of a camera, attributes of persons or vehicles from hyperzooms generated from image frames captured by the camera, the hyperzooms representing traffic patterns of the persons or vehicles, the extracting performed using a feature extractor of an on-camera convolutional neural network (CNN) comprising an inverted residual structure, the attributes comprising at least colors of clothing of the persons or colors of the vehicles

1108 Generate, by the computer vision processor, mobile semantic segmentation models of the CNN using the hyperzooms and the attributes

1112 Generate, by the computer vision processor, an index table for a NoSQL key-value structure on cloud storage, the index table referenced by the attributes

1116 Store, by the camera, the hyperzooms in the NoSQL key-value structure on the cloud storage via a server instance, the index table comprising pointers to the hyperzooms in the NoSQL key-value structure, wherein the hyperzooms are removed from the camera

1120 Generate, by the computer vision processor, attribute analytics by executing the mobile semantic segmentation models based on the attributes while obviating network usage by the camera

1124 Store, by the computer vision processor, the attribute analytics in a key-value database located on a non-transitory computer-readable storage medium of the camera, the attribute analytics indexed by the attributes

1128 Receive, by the computer vision processor, a query from the server instance over a full-duplex communication channel, the query specifying one or more of the attributes

1132 Filter, by the computer vision processor, the attribute analytics using the one or more of the attributes to obtain a portion of the traffic patterns corresponding to a particular person or vehicle

1136 Transmit, by the camera, the portion of the traffic patterns corresponding to the particular person or vehicle over the full-duplex communication channel for sending to a user device by the server instance.

*FIG. 11*

HYPERZOOM ATTRIBUTE ANALYTICS ON THE EDGE

CROSS-REFERENCE TO RELATED APPLICATIONS

This application is a continuation of U.S. patent application Ser. No. 17/869,164, filed Jul. 20, 2022, which is a continuation of U.S. patent application Ser. No. 17/700,396, filed Mar. 21, 2022, issued as U.S. Pat. No. 11,429,664 on Aug. 30, 2022, both of which are incorporated by reference herein in their entirety.

TECHNICAL FIELD

The present disclosure is generally related to security systems and specifically to systems and methods for hyperzoom attribute analytics on the edge.

BACKGROUND

Security cameras and closed-circuit television (CCTV) cameras are sometimes used to transmit video and audio signals to wireless receivers through a radio band. However, traditional security systems using conventional cameras sometimes malfunction when a camera fails to record video, the camera loses a Wi-Fi connection, the camera doesn't work at night, or a user cannot remotely view the video feed from the security camera. Moreover, security systems can sometimes be inefficient due to large image file sizes and network latencies.

SUMMARY

The embodiments disclosed herein describe methods, apparatuses, and systems for hyperzoom attribute analytics on the edge. In some embodiments, a computer vision processor of a camera generates hyperzooms for persons or vehicles from image frames captured by the camera. The hyperzooms include a first hyperzoom and a second hyperzoom. The first hyperzoom is associated with the persons or vehicles. The computer vision processor tracks traffic patterns of the persons or vehicles while obviating network usage by the camera. In some embodiments, the computer vision processor predicts positions of the persons or vehicles using a Kalman Filter from the first hyperzoom. The computer vision processor detects the persons or vehicles in the second hyperzoom. The computer vision processor updates the positions of the persons or vehicles based on detecting the persons or vehicles in the second hyperzoom. The first hyperzoom is removed from the camera.

In some embodiments, the computer vision processor generates tracks of the persons or vehicles based on the updated positions. The second hyperzoom is removed from the camera. The computer vision processor generates track metadata from the tracks for storing in a key-value database located on a non-transitory computer-readable storage medium of the camera. The tracks are removed from the camera. The camera receives a query from a server instance over a full-duplex communication channel. The query is encoded as a key and a message. The message specifies a characteristic of the traffic patterns. The computer vision processor generates a response to the message by filtering the track metadata using the key and the characteristic of the traffic patterns. The camera transmits the response to the server instance over the full-duplex communication channel. The response is for sending to a user device by the server instance.

In some embodiments, the computer vision processor generates a visualization of the tracks. The camera stores the tracks and the visualization in a nonrelational Structured Query Language (NoSQL) key-value structure on cloud storage via the server instance. The visualization is for sending to the user device by the server instance.

In some embodiments, the key-value database stores the tracks as byte arrays on the non-transitory computer-readable storage medium.

In some embodiments, the key-value database stores the tracks in immutable row partitions in sorted order.

In some embodiments, the key-value database stores the tracks in a relational database management system (RDBMS) on the non-transitory computer-readable storage medium.

In some embodiments, the computer vision processor assigns identifiers to the persons or vehicles in the first hyperzoom. Responsive to detecting the persons or vehicles in the second hyperzoom, the computer vision processor persists the identifiers in the second hyperzoom. The computer vision processor associates the second hyperzoom with the persons or vehicles.

In some embodiments, the computer vision processor generates a heatmap using the track metadata. The camera sends the heatmap to the server instance over the full-duplex communication channel. The heatmap is for sending to the user device by the server instance.

In some embodiments, a computer vision processor of a camera extracts attributes of persons or vehicles from hyperzooms generated from image frames captured by the camera. The hyperzooms represent traffic patterns of the persons or vehicles. The extracting is performed using a feature extractor of an on-camera convolutional neural network (CNN) comprising an inverted residual structure. The attributes include at least colors of clothing of the persons or colors of the vehicles. The computer vision processor generates mobile semantic segmentation models of the CNN using the hyperzooms and the attributes. The computer vision processor generates an index table for a NoSQL key-value structure on cloud storage. The index table is referenced by the attributes. The camera stores the hyperzooms in the NoSQL key-value structure on the cloud storage via a server instance. The index table includes pointers to the hyperzooms in the NoSQL key-value structure. The hyperzooms are removed from the camera. The computer vision processor generates attribute analytics by executing the mobile semantic segmentation models based on the attributes while obviating network usage by the camera. The computer vision processor stores the attribute analytics in a key-value database located on a non-transitory computer-readable storage medium of the camera. The attribute analytics are indexed by the attributes. The computer vision processor receives a query from the server instance over a full-duplex communication channel. The query specifies one or more of the attributes. The computer vision processor filters the attribute analytics using the one or more of the attributes to obtain a portion of the traffic patterns corresponding to a particular person or vehicle. The camera sends the portion of the traffic patterns corresponding to the particular person or vehicle over the full-duplex communication channel for sending to a user device by the server instance.

In some embodiments, generating the mobile semantic segmentation models includes training, by the computer vision processor, the CNN using the hyperzooms and the attributes.

In some embodiments, the query is a first query and the portion of the traffic patterns is transmitted asynchronously with respect to a second query received by the computer vision processor from the server instance over the full-duplex communication channel.

In some embodiments, the camera receives a signal that a network connection to the camera is active. Responsive to receiving the signal, the computer vision processor sends a descriptor of the camera to the server instance.

In some embodiments, the server instance is a first server instance. The camera connects to the full-duplex communication channel, which is generated by the first server instance and references the descriptor. The full-duplex communication channel sends queries generated by a second server instance. The queries are initiated by the user device and encoded by the second server instance.

In some embodiments, the key-value database stores the attribute analytics as byte arrays on the non-transitory computer-readable storage medium or in immutable row partitions in sorted order.

In some embodiments, the key-value database stores the attribute analytics in a relational database management system (RDBMS) on the non-transitory computer-readable storage medium.

In additional embodiments, a computer vision processor of a camera generates tracks of a person or vehicle from hyperzooms depicting the person or vehicle, the hyperzooms generated from image frames captured by the camera. The computer vision processor receives coordinates of a line from a server instance over a full-duplex communication channel. The coordinates of the line are defined by a user device communicably coupled to the server instance. The computer vision processor defines a first parallel line and a second parallel line spaced from the line and positioned on different sides of the line. The computer vision processor determines a first position of the person or vehicle relative to the line from the tracks. The camera captures an image frame of the person or vehicle, the image frame captured after the image frames. The computer vision processor determines a second position of the person or vehicle relative to the line from the image frame captured after the image frames. The computer vision processor determines that the person or vehicle has crossed the line from a first side of the first parallel line to a second side of the second parallel line based on a difference between the first position and the second position. Responsive to determining that a first distance between the second position and the second parallel line is smaller than a second distance between the second position and the line, the computer vision processor stores metadata describing that the person or vehicle has crossed the line in a key-value database located on a memory card of the camera. The camera receives a query from the server instance over the full-duplex communication channel. The query requests a count of a number of times the person or vehicle has crossed the line. The computer vision processor generates a response to the query from the metadata stored in the key-value database. The camera sends the response to the server instance over the full-duplex communication channel. The response is for sending to the user device by the server instance.

These and other aspects, features, and implementations can be expressed as methods, apparatuses, systems, components, program products, means, or steps for performing a function, and in other ways.

These and other aspects, features, and implementations will become apparent from the following descriptions, including the claims.

BRIEF DESCRIPTION OF THE DRAWINGS

FIG. 2A illustrates a computer program for people and vehicle analytics on the edge, in accordance with one or more embodiments.

FIG. 2B illustrates an example database for people and vehicle analytics on the edge, in accordance with one or more embodiments.

FIG. 4 illustrates an example graphical user interface (GUI) for people and vehicle analytics on the edge, in accordance with one or more embodiments.

FIG. 5 illustrates an example GUI for people and vehicle analytics on the edge, in accordance with one or more embodiments.

FIG. 11 is a flow diagram illustrating an example process for people and vehicle analytics on the edge, in accordance with one or more embodiments.

DETAILED DESCRIPTION

Figure 1:
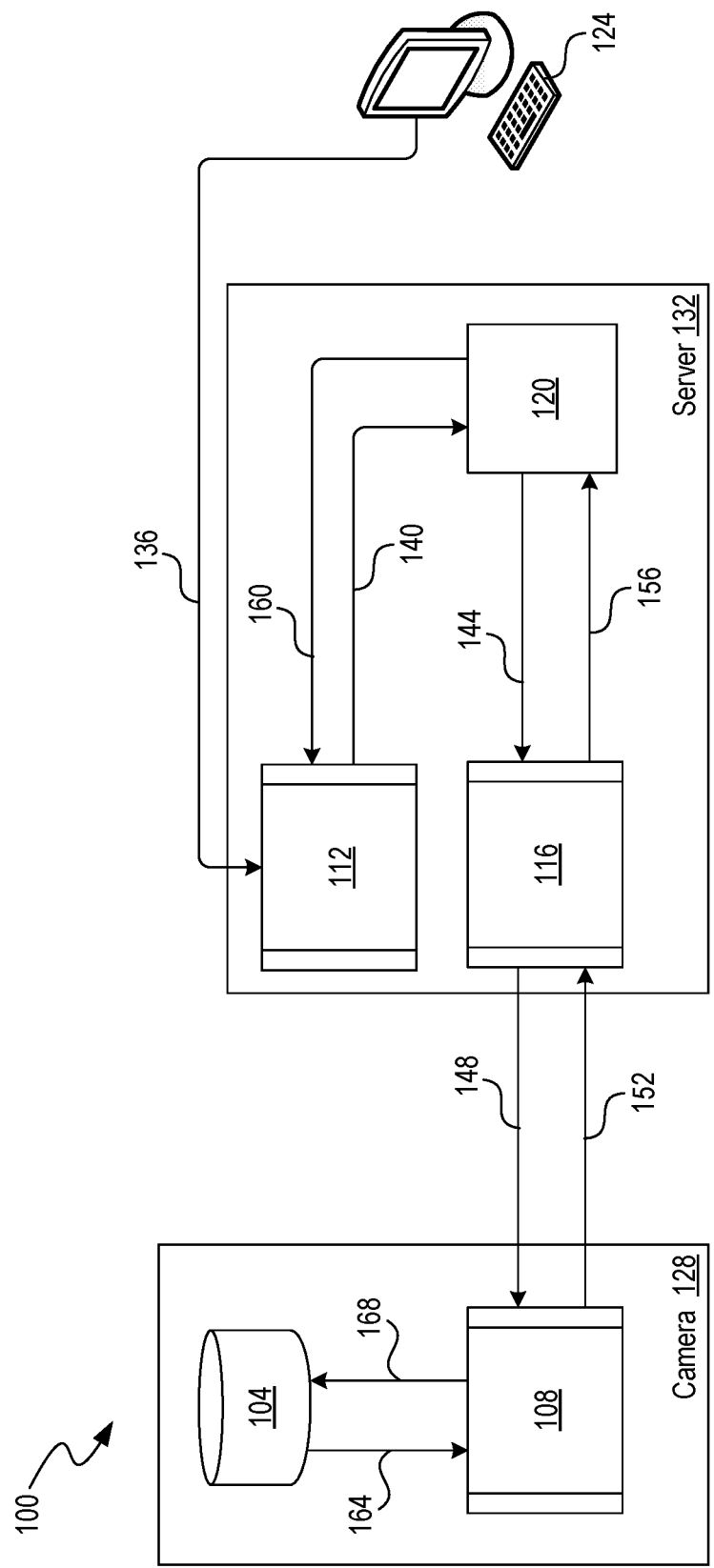
FIG. 1 is a block diagram illustrating an example system for people and vehicle analytics on the edge, in accordance with one or more embodiments.

Embodiments of the present disclosure will be described more thoroughly from now on with reference to the accompanying drawings. Like numerals represent like elements throughout the several figures, and in which example embodiments are shown. However, embodiments of the claims can be embodied in many different forms and should not be construed as limited to the embodiments set forth herein. The examples set forth herein are non-limiting examples and are merely examples, among other possible examples. Throughout this specification, plural instances (e.g., "602") can implement components, operations, or structures (e.g., "602a") described as a single instance.

Further, plural instances (e.g., "602") refer collectively to a set of components, operations, or structures (e.g., "602a") described as a single instance. The description of a single component (e.g., "602a") applies equally to a like-numbered component (e.g., "602b") unless indicated otherwise. These and other aspects, features, and implementations can be expressed as methods, apparatuses, systems, components, program products, means, or steps for performing a function, and in other ways. These and other aspects, features, and implementations will become apparent from the following descriptions, including the claims.

The embodiments disclosed herein describe methods, apparatuses, and systems for hyperzoom attribute analytics on the edge. In some embodiments, a computer vision processor of a camera generates hyperzooms for persons or vehicles from image frames captured by the camera. The hyperzooms include a first hyperzoom and a second hyperzoom. The first hyperzoom is associated with the persons or vehicles. The embodiments disclosed herein perform tracking and counting of people and vehicles by a camera across a series of image or video frames. The term "on the edge" refers to edge-based computing or edge processing. In the embodiments described herein, the execution of aggregation, data manipulation, bandwidth reduction, and other logic is performed on the edge (directly on the wireless camera).

The computer vision processor tracks traffic patterns of the persons or vehicles while obviating network usage by the camera. For tracking traffic of people in an environment, the camera identifies the different detections in a frame and assigns each person an identification (ID). In subsequent frames, the camera carries forward each person's ID. If the person has moved away from the frame, that ID can be dropped. If a new person appears, the camera assigns them a fresh ID. In some embodiments, positions of the persons or vehicles are predicted by a Kalman Filter using the first hyperzoom. The persons or vehicles are detected in the second hyperzoom. The positions of the persons or vehicles are updated based on detecting the persons or vehicles in the second hyperzoom. The first hyperzoom is removed from the camera.

In some embodiments, tracks of the persons or vehicles are generated based on the updated positions. The second hyperzoom is removed from the camera. Track metadata is generated from the tracks for storing in a key-value database located on a non-transitory computer-readable storage medium of the camera. The tracks are removed from the camera. The camera receives a query from a server instance over a full-duplex communication channel. The query is encoded as a key and a message. The message specifies a characteristic of the traffic patterns. The computer vision processor generates a response to the message by filtering the track metadata using the key and the characteristic of the traffic patterns. The camera sends the response to the server instance over the full-duplex communication channel. The response is for sending to a user device by the server instance.

Some embodiments disclosed herein describe methods, apparatuses, and systems for people and vehicle analytics on the edge. In some embodiments, a computer vision processor of a camera extracts attributes of persons or vehicles from hyperzooms generated from image frames captured by the camera. The hyperzooms represent traffic patterns of the persons or vehicles. In some embodiments, hyperzooms are used to detach a moving object from the background and differentiate between the objects in a video or image frame. A hyperzoom refers to a bounding box that the camera has zoomed into to describe the spatial location of an object, e.g., a person or a vehicle. The hyperzoom is rectangular and can be specified by the x and y coordinates of the upper-left corner and the lower-right corner of the hyperzoom. In other embodiments, the camera specifies a hyperzoom by the (x,y) coordinates of the hyperzoom center, and the width and height of the hyperzoom. The camera disclosed herein generates hyperzooms to detect persons and vehicular activity from images captured by the camera. The hyperzoom that bounds each object in the image frames is used to track and detect activities of the moving objects in further frames. The hyperzooms are used to detect humans and human activities, e.g., crowd traffic.

In some embodiments, extracting attributes is performed using a feature extractor of an on-camera convolutional neural network (CNN) including an inverted residual structure. The attributes include at least colors of clothing of the persons or colors of the vehicles. The computer vision processor generates mobile semantic segmentation models of the CNN using the hyperzooms and the attributes. The computer vision processor generates an index table for a NoSQL key-value structure on cloud storage. The index table is referenced by the attributes. The camera stores the hyperzooms in the NoSQL key-value structure on the cloud storage via a server instance. The index table includes pointers to the hyperzooms in the NoSQL key-value structure. The hyperzooms are removed from the cam era.

In some embodiments, the computer vision processor generates attribute analytics by executing the mobile semantic segmentation models based on the attributes while obviating network usage by the camera. The computer vision processor stores the attribute analytics in a key-value database located on a non-transitory computer-readable storage medium of the camera. The attribute analytics are indexed by the attributes. The computer vision processor receives a query from the server instance over a full-duplex communication channel. The query specifies one or more of the attributes. The computer vision processor filters the attribute analytics using the one or more of the attributes to obtain a portion of the traffic patterns corresponding to a particular person or vehicle. The camera sends the portion of the traffic patterns corresponding to the particular person or vehicle over the full-duplex communication channel for sending to a user device by the server instance.

The advantages and benefits of the methods, systems, and apparatuses disclosed herein include detecting and differentiating people that look similar to prevent the computer vision model switching IDs. The computer vision processing is performed on the camera and metadata is stored on the camera, such that no network access is needed for the image processing. The performance of the embodiments on the edge provides improvements in response times and bandwidth. Such embodiments significantly reduce network traffic and communication latencies. For example, the camera disclosed can perform computation at around 10 frames per second, which a network server connected to the camera would not be able to do because of bandwidth and networking constraints. Performing the embodiments on the edge thus provides significant improvements in response times.

The edge-based processing disclosed enhances computation speed and is able to deliver much faster response times from a performance standpoint. Moreover, the camera disclosed provides bandwidth relief. The server instances and cloud database disclosed provide improved data management, better security, and improved reliability compared to traditional methods. The edge computing camera embodiments further decrease response time and latency to respond to queries instead of going through the server instances or cloud for computation. The camera provides higher security and less risk compared to traditional methods. The embodiments also provide smaller transmission costs, greater scalability and versatility, lower infrastructure costs, and reduced data loss compared to traditional methods.

Moreover, the embodiments disclosed herein address situations when people are occluded, e.g., when a pedestrian or vehicle is hidden behind someone or something else, and situations when objects disappear and reappear in later frames. The camera disclosed herein implements carefully sized bounding boxes, such that too much background is not "captured" in the features, thus increasing the effectiveness of the people tracking algorithm. In addition, the camera can distinguish between people that are dressed similarly, e.g., at a sporting event, to prevent the extraction of similar features that could result in ID switching. The advantages of the convolutional neural network (CNN) used for machine learning (ML) in the disclosed embodiments include the obviation of feature extraction and the use of shared weight in convolutional layers, which means that the same filter (weights bank) is used for each node in the layer; this both reduces memory footprint and improves performance.

FIG. 1 is a block diagram illustrating an example system 100 for people and vehicle analytics on the edge, in accordance with one or more embodiments. The system 100 includes a camera 128, a server 132, and a user device 124. The system 100 is implemented using portions of the example computer system 1300 illustrated and described in more detail with reference to FIG. 13. Likewise, embodiments can include different and/or additional components, or be connected in different ways.

The server 132 and the user device 124 can communicate with many different cameras at the same time. The many different cameras can be located in different areas of a building or in different geographical locations entirely. The camera 128 combines edge processing and storage to provide advanced physical security across numerous sites and rapid sharing of video feeds via SMS text or weblink, such as with offsite law enforcement personnel or company management, and it enables security personnel to remotely monitor entryways, provide badges, and unlock doors without requiring IT involvement. The camera 128 includes a computer vision processor 108 and a memory card or embedded non-transitory computer-readable storage medium 104. The computer vision processor 108 generates hyperzooms for persons or vehicles from image frames captured by the camera 128. The camera can capture image frames at 10 frames per second (fps). In some embodiments, the computer vision processor 108 is a system-on-a-chip (SoC) that performs image processing, video encoding, and CVflow™ computer vision processing. In some embodiments, the architecture of the computer vision processor 108 provides deep neural network (DNN) processing for computer vision applications and the processes illustrated and described in more detail with reference to FIGS. 10 and 11. The computer vision processor 108 can extract maximum image detail in high contrast scenes, e.g., to extract attributes of people and vehicles from hyperzooms.

The computer vision processor 108 tracks traffic patterns of the persons or vehicles on the edge while obviating network usage by the camera 128. An example network adapter 1312 performing this function and an example network 1314 are illustrated and described in more detail with reference to FIG. 13. The term "on the edge" refers to edge-based computing or edge processing. In the embodiments described herein, the execution of aggregation, data manipulation, bandwidth reduction, and other logic is performed on the edge (directly on the wireless camera 128). Network usage is obviated because the image processing is not performed on the server 132 or other external device.

Figure 10:
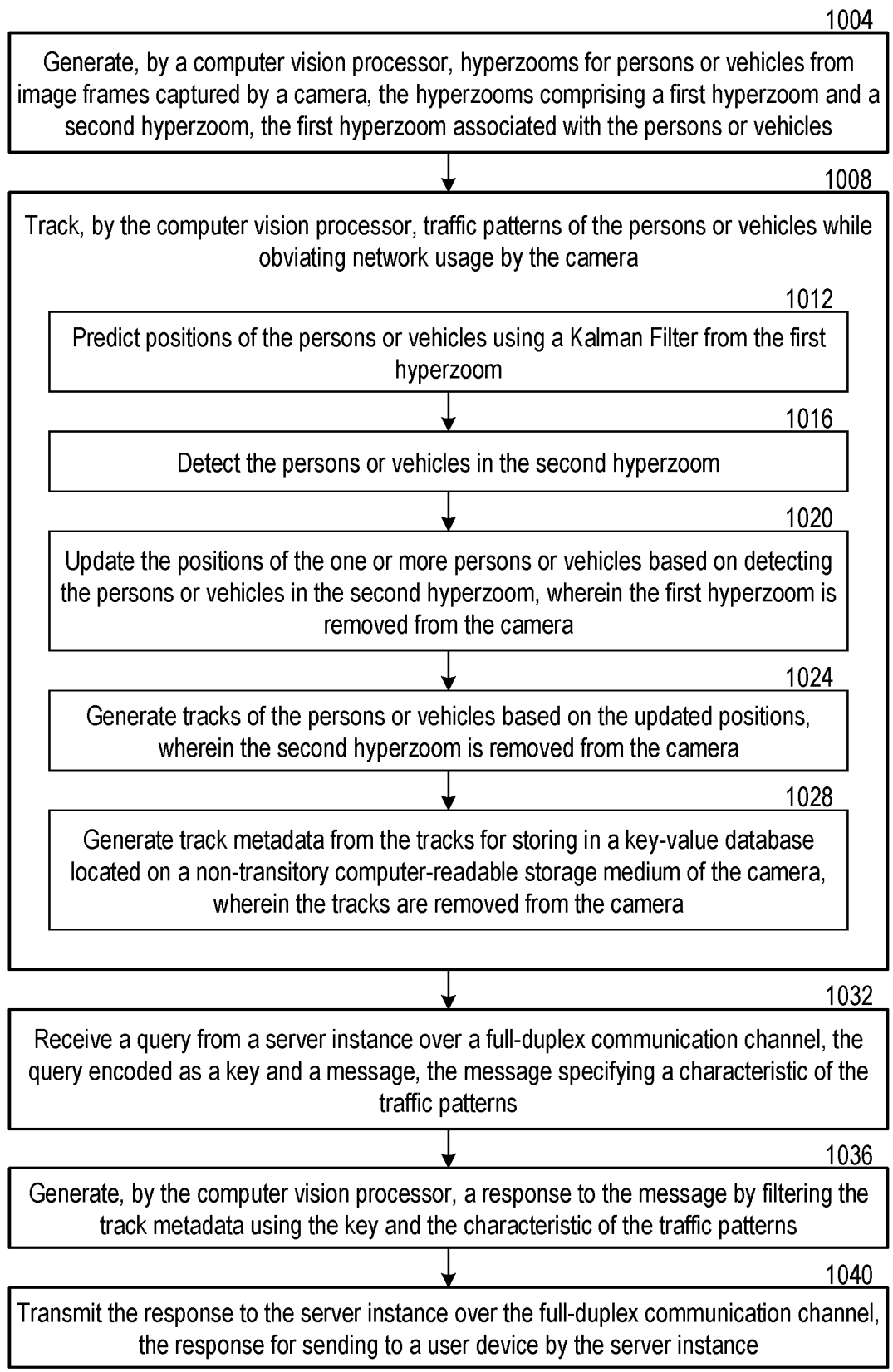
FIG. 10 is a flow diagram illustrating an example process for people and vehicle analytics on the edge, in accordance with one or more embodiments.

For edge computing, the first hyperzoom is removed from the camera 128 so that storage in the camera 128 is freed up and the processing, e.g., in FIGS. 10 and 11 is performed on the edge without sending data to the server 132 for processing. Thus network use is obviated. For example, "Core DB Flush Logic" is implemented on the camera 128, such that as the computer vision processor 108 ingests image frames, analysis is performed and a list of open tracklets is maintained. Previous tracklets can be removed from memory and/or the storage medium 104. In an example, a minimum query increment is 300 seconds. The camera 128's logic starts a timer fired every 300 seconds and executes the flush logic to remove hyperzooms, image frames, tracks, and track visualizations from the camera 128. In some embodiments, the camera 128 executes a script periodically (e.g., running once every day) to clean expired entries in a database on the storage medium 104. For example, the camera 128 can have a retention period of 30 days. The data items in the database on the storage medium 104 can thus be periodically scanned for selective deletion.

The computer vision processor 108 generates tracks of persons or vehicles based on updated positions after a next hyperzoom is processed. In some embodiments, the computer vision processor 108 generates the tracks using deep sort or centroid tracking by comparing the similarity of detected objects with each other in each processed hyperzoom. If a person or vehicle has the same similarity metric throughout the frame, the computer vision processor 108 generates a track for the object throughout a sequence of hyperzooms (see FIG. 3) and retains the same identifier for the object. The consistent identifier for a particular object enables the people and vehicle counting operation.

In some embodiments, the computer vision processor 108 generates the tracks using the deep sort method, which increases the number of image frames processed per second to about 10 frames per second (fps). In other embodiments, centroid tracking is used. In centroid tracking, the computer vision processor 108 computes a centroid from coordinates of a hyperzoom. For example, the computer vision processor 108 uses coordinates of the hyperzoom ($x_{min}$, $y_{min}$, $x_{max}$, and $y_{max}$) and determines ($x_{center}$, $y_{center}$) coordinates for each of the detected objects in each frame. The centroid can be determined as $X_{cen}=(x_{min}+x_{max})/2$ and $Y_{cen}=(y_{min}+y_{max})/2$, where $x_{min}$, $y_{min}$, $x_{max}$, and $y_{max}$ are the hyperzoom coordinates. The computer vision processor 108 determines a Euclidian distance between the second hyperzoom and the first hyperzoom. After determining the Euclidian distance, the computer vision processor 108 updates the position of the centroid in the frame, thereby tracking the object. The second hyperzoom is removed from the camera 128 to reduce the amount of data stored and enable edge processing.

In some embodiments, the computer vision processor 108 expresses the tracks as image positions measured in pixel units relative to the upper-left corner of the image frame. For example, in a 320×240 pixel image, the upper-left corner is at image position (0.0, 0.0) and the lower-right corner is at (320.0, 240.0). Each physical object within the image frame is assigned world coordinates measured in scaled world units (e.g., meters) relative to a specified reference frame. In some embodiments, a coordinate system or set of transformations used to convert image positions into world coordinates is used. The coordinate system is used to define the tracks for each frame of the video as the scale (image units per world unit), origin (image position of the reference frame origin), and angle (counterclockwise angle from the image x-axis to the world x-axis).

The computer vision processor 108 generates track metadata 168 from the tracks for storing in a database located on the non-transitory computer-readable storage medium 104 of the camera 128. The track metadata 168 can be generated as structural metadata (e.g., metadata about containers of data, how compound objects are put together, types, versions, relationships, etc.), statistical metadata (e.g., the processes that collect, process, or produce statistical data, etc.), etc. The track metadata 168 can be stored in the form of a data structure including tables, fields, data types, indexes, or partitions in a relational engine, or as databases, dimensions, measures, and data mining models. In some embodiments the track metadata 168 defines a data model and the way it is accessed and presented to the users, with the reports, schedules, distribution lists, and user security rights.

The non-transitory computer-readable storage medium 104 is any lightweight, mobile, embedded memory or memory card in the camera that has rapid read/write rates, enabling edge processing. In some embodiments, a secure digital (SD) card or micro SD card is used. SD is a proprietary non-volatile memory card format developed by the SD Association (SDA) for use in portable devices. A microSD card is a removable miniaturized SD flash memory card, sometimes called T-Flash or TransFlash. TransFlash cards are electrically compatible with larger SD cards. In other embodiments, Compact Flash (CF) cards that can store 256 GB+ data with 160 Mb/second access times are used. In other embodiments, XQD memory cards designed for high speed read and write, and suitable for high resolution (4K) video recording are used. In other embodiments, Memory Sticks (MS) that provide flexible storage, such as Memory Stick Duo, Memory Stick PRO, Memory Stick PRO-HG, or Memory Stick Micro M2, are used.

The database is an embedded database to satisfy resource constraints, and is small and lightweight. The database supports frequent writes, batched reads, time-series data, and a C/C++ interface. In some embodiments, the database is a key-value database located on the non-transitory computer-readable storage medium 104. A key-value database stores the track metadata 168 as a collection of key-value pairs in which a key (e.g., an alphanumeric string) serves as a unique ID. The key-value database or key-value store is implemented for storing, retrieving, and managing the track metadata 168 as associative arrays in a data structure, more commonly as a dictionary or hash table. The track metadata 168 is stored and retrieved using a key (e.g., an alphanumeric string) that uniquely identifies the record, and is used to find the data within the database. In some embodiments, the database is a relational database (RDB). An RDB predefines the data structure in the database as a series of tables containing fields with well-defined data types. Exposing the data types to the database program allows it to apply a number of optimizations.

In some embodiments, the database stores the tracks as byte arrays on the non-transitory computer-readable storage medium 104. For example, the database can be a lightning memory-mapped database (LMDB) that stores arbitrary key/data pairs as byte arrays, has a range-based search capability, supports multiple data items for a single key, and has a special mode for appending records without checking for consistency. The database can also be used concurrently in a multi-threaded or multi-processing environment, with read performance scaling linearly by design. Multiple queries can simultaneously open and use the database, as a means to scale up performance.

In some embodiments, the database stores the tracks in immutable row partitions in sorted order. For example, the database can include an SSTable, which provides a persistent, ordered immutable map from keys to values, where both keys and values are arbitrary byte strings. Operations can be provided to look up the value associated with a specified key, and to iterate over all key-value pairs in a specified key range. A block index (stored at the end of the SSTable) can be used to locate blocks; the index is loaded into memory when the SSTable is opened.

In some embodiments, the database stores the tracks in a relational database management system (RDBMS) on the non-transitory computer-readable storage medium 104. For example, the database can be a relational database that organizes data into one or more data tables in which data types may be related to each other. The relations structure the data. The queries create, modify, and extract data from the relational database, as well as control user access to the database. As described, the tracks are removed from the camera 128 to reduce storage requirements on the camera 128 after metadata generation. Thus edge processing is enabled.

The server 132 is implemented using computer hardware or software, e.g., using some of the components of the example computer system 1300 illustrated and described in more detail with reference to FIG. 13. The server 132 provides functionality for the server instances 112, 116 and application programming interfaces (APIs) that run on the server instances 112, 116. For example, the server 132 sends track visualizations to and retrieves them from the cloud storage. The camera 132 also sends queries 148 from the user device 124 to the camera 128, and responses 152 from the camera 128 to the user device 124. A single server 132 can serve multiple cameras 128. In some embodiments, the tracks are stored by the camera 128 on a NoSQL key-value structure on cloud storage via the server instance 112 (sometimes referred to as a "second server instance").

The server instances 112, 116 are virtual machines running workloads, e.g., in the cloud. The server instance 116 is sometimes referred to as a "first server instance." For example, the server instances 112, 116 can be launched in a specified cloud infrastructure. In some embodiments, the server instance 112 is a collection of Structured Query Language (SQL) Server databases run by the server 132. The details of each server instance 112, 116 can be viewed on a service console which can be web-based or command-line based. The server instances 112, 116 can be controlled or managed separately. Each SQL Server instance has its own ports, databases, and logins. The multiple server instances 112, 116 provide advantages such as stability and backup for the camera 128. The system 100 itself can transfer the load in case of unprecedented issues such as data loss or system crashes. For example, the server instance 116 can take up the work of the server instance 112 if affected.

In some embodiments, the NoSQL key-value structure is a proprietary NoSQL database service that supports key-value and document data structures. In some embodiments, the NoSQL key-value structure resolves version conflicts and uses synchronous replication across multiple data centers for high durability and availability. In some embodiments, the computer vision processor 108 generates a visualization of the tracks. The visualization provides options for displaying or viewing the object tracks. For example, the color of each track can be a constant color for all tracks, a random color from a color map can be chosen for each track, a track color can be selected based on the x velocity, y velocity, or magnitude of the velocity, etc. A number of points of each track can be changed or every point of every track can be displayed. Lines can be drawn through points and the width of the lines can be changed. The camera 128 stores the tracks and the visualization in the NoSQL key-value structure on cloud storage via the server instance 116. The visualization is for sending to the user device 124 by the server instance 112. For example, the data 160 is read from the in-memory data structure store 120 by the server instance 112 and sent to the user device 124.

In some embodiments, the camera 128 receives a query 148 from the server instance 116 over a full-duplex communication channel. The query 148 is generated from information 136 sent by the user device 124 to the server instance 112 to initiate the query 148. The server instance 112 pushes a message 140 based on the information 136 to the in-memory data structure store 120 to initiate the query 148. The server instance 116 receives a message 144 including the query 148 from the in-memory data structure store 120. In some embodiments, the query 148 from the server 132 includes a date range and an increment. In some embodiments, the query 148 from the server 132 includes a start time, an end time, and an increment. The server 132 can query the database on the storage medium 104 by fetching rows and columns of data corresponding to the query 148. For example, if the query 148 is "startTime=100, endTime=200, increment=10," the camera 128 will return the column count10 of key 100, 110, 120, . . . , 180, 190. In some embodiments, both the start time and the end time are multiples of the increment.

The queries are initiated by the user device 124. For example, the user device can initiate the query 148 in SQL or another language to the server instance 112 for the server instance 112 to place it in an in-memory data structure store 120. The in-memory data structure store 120 is a distributed, in-memory key-value database and can be implemented as a cache or message broker. The in-memory data structure store 120 supports different kinds of abstract data structures, such as strings, lists, maps, sets, sorted sets, bitmaps, streams, and spatial indices. In another example, the query 148 can be initiated in a natural language for the server instance 112 to encode it into a structured language. In another example, the query 148 can be initiated using a graphical user interface as shown by FIGS. 4 and 5, or by menu controls as in FIGS. 6 and 7. The queries are encoded by the server instance 112. For example, the queries can be encoded into SQL or another language. In some embodiments, the server instance 112 encodes the query string as a part of a uniform resource locator (URL) that assigns values to specified parameters. A query string can include fields added to a base URL by an API running on the server instance 112.

To enable the persisting of track metadata and the attribute analytics on camera, the server 132 is implemented to support proactively sending messages to the camera 128. In some embodiments, the server 132 uses a combination of a full-duplex communication channel (e.g., WebSocket) and an in-memory data structure store 120 (e.g., Redis) to implement and maintain a connection to the camera 128. The camera 128 is implemented to connect to the full-duplex communication channel endpoint when the camera 128 is restarted or after the network connected to the camera 128 is disconnected and re-connected. Once the connection to the full-duplex communication channel is established, the camera 128 periodically pings the server 132 to determine whether the connection is still live. The full-duplex communication channel between the server instance 116 and the camera 128 operates according to a computer communications protocol, providing full-duplex communication over a single TCP connection. For example, the WebSocket protocol standardized by the Internet Engineering Task Force (IETF) as RFC 6455 can be used. In other embodiments, the full-duplex communication channel uses SSE, which provides a way to push data from the server 132 to the camera 128 over HTTP. The query 148 is a request for data or information from the database, e.g., generated as results returned by SQL or as pictorials, graphs, or complex results, e.g., trend analyses from data-mining tools.

The query 148 is encoded as a key and a message. The key is a string (e.g., an alphanumeric string) or array of structured data used to filter the track metadata stored in the database on the non-transitory computer-readable storage medium 104. In some embodiments, the key has multiple components, specified as an ordered list. A "major" key identifies a portion of the track metadata and consists of the leading components of the key. The subsequent components are called "minor keys." The organization can be similar to a directory path specification in a file system (e.g., /Major/minor1/minor2/). For example, the key can specify a time range of the hyperzooms, a geographic location where the hyperzooms were shot, a set of days in a week (e.g., Mondays and Wednesdays only), coordinates of a line that people or vehicles are crossing (see FIG. 9), etc. The message specifies a characteristic of the traffic patterns of people and vehicles captured by the camera 128 and used to generate the results 164 of filtering the database on the storage medium 104. For example, the message can refer to a count of people, a count of vehicles, a heatmap of people or vehicles (see FIG. 7), a count of people or vehicles crossing a line in a particular direction (see FIG. 9), etc. The message can be encoded into one of several different query languages, e.g., SQL, DMX, Datalog, and AQL, etc.

In some embodiments, the computer vision processor 108 generates a response 152 to the message by filtering the track metadata using the key and the characteristic of the traffic patterns. The results 164 of filtering the database on the storage medium 104 are part of the response 152. For example, the response 152 can contain detections of particular people and faces (see FIG. 6) or filtered results 156 based on clothing color, apparent sex, and the presence of backpacks. The response 152 can display a number indicating the number of people detected in an image frame. The response 152 can display lines that provide a sense of which parts of a clip contain the most people activity. The camera 128 transmits the response 152 to the server instance 116 over the full-duplex communication channel. The response 152 is for sending to a user device 124 by the server instance 112. The user device 124 is a smartphone, laptop, desktop, tablet, etc., implemented using at least some parts of the computer system 1300 of FIG. 13. The user device 124 thus initiates queries, plots bar diagrams from the response 152, and retrieves track visualizations from the cloud storage via the server 132.

In some embodiments, the computer vision processor 108 extracts attributes of persons or vehicles from hyperzooms generated from image frames captured by the camera 128. The extraction of features and attributes (e.g., features 1212) is described in more detail with reference to FIG. 12. The attributes can include clothing color, apparent sex, the presence of backpacks, a make or model of vehicles, vehicle color, etc. The hyperzooms represent traffic patterns of the persons or vehicles (see FIG. 3). In some embodiments, the extracting is performed using a feature extractor of an on-camera convolutional neural network (CNN) (see FIG.

12) including an inverted residual structure. For example, in the CNN, the shortcut connections are between thin bottleneck layers. An intermediate expansion layer uses lightweight depthwise convolutions to filter features as a source of non-linearity. An example feature extraction module 1208 is illustrated and described in more detail with reference to FIG. 12.

In some embodiments, the computer vision processor 108 generates mobile semantic segmentation models of the CNN using the hyperzooms and the attributes. In some embodiments, the mobile semantic segmentation models cluster parts of an image frame or hyperzoom together which belong to the same object class. Semantic segmentation is a form of pixel-level prediction because each pixel in the hyperzoom image is classified according to an attribute or category. The models are referred to as mobile because they are executed on the computer vision processor 108 itself to provide edge computing capabilities. In some embodiments, generating the mobile semantic segmentation models includes training, by the computer vision processor, the CNN using the hyperzooms and the attributes. Training an example machine learning model 1216 is illustrated and described in more detail with reference to FIG. 12. For example, the attributes can be used as the features 1212, the hyperzooms can be used as the training data 1220, and the image frames can be used as the validation set 1232, as illustrated and described in more detail with reference to FIG. 12. In some embodiments, generating the mobile semantic segmentation models comprises classification (making a prediction for a whole input), localization/detection (providing information regarding the spatial location of the classes), or fine-grained inference by making dense predictions inferring labels for every pixel, so that each pixel is labeled with the class of its enclosing object or region.

In some embodiments, the computer vision processor 108 generates an index table for a NoSQL key-value structure on cloud storage. The index table can use primary keys to uniquely identify each hyperzoom or track, and secondary indexes to provide more querying flexibility. The index table is referenced by the attributes. In some embodiments, the hyperzooms are keyed or indexed by a camera_id and time (milliseconds). More than one hyperzoom can be persisted for the same person. In other embodiments, only one hyperzoom is persisted for each tracked person. In some embodiments, the camera 128 stores the hyperzooms in the NoSQL key-value structure on the cloud storage via the server instance 116. The index table includes pointers to the hyperzooms in the NoSQL key-value structure. For example, the index table can include a partition key and a sort key. To free up storage on the camera 128, the hyperzooms are removed from the camera 128.

In some embodiments, the camera executes a computer vision (CV) algorithm and generates people analytics. For example, the computer vision processor 108 generates attribute analytics by executing the mobile semantic segmentation models based on the attributes while obviating network usage by the camera 128. After executing the mobile semantic segmentation models for people and vehicles, the camera 128 stores the attribute analytics in a database on the storage medium 104, e.g., on a relational database such as SQLite. To reduce latency, the camera 128 generates indexing for the attributes, e.g., using SQLite. The camera 128 uploads hyperzooms to cloud storage. In some embodiments, a cross-camera search using a server 132 query to all cameras in the system is performed. Thus edge processing is enabled. In some embodiments, a "Person History" feature is enabled such that the camera 128 performs people detection as well as more complex analytics, such as the ability to search for faces, and for people by clothing color. In some embodiments, all detected people across different cameras can be displayed (see FIG. 6). In some embodiments, person-of-interest (POI) alerts can be enabled that provide the ability to identify and search for individuals in the camera footage, allowing a user device 124 to quickly find meaningful events and save time during critical investigations.

In some embodiments, the computer vision processor 108 stores the attribute analytics in a key-value database located on the non-transitory computer-readable storage medium 104 of the camera 128. The attribute analytics are indexed by the attributes. In some embodiments, the camera 128 can go into a sleep mode, disconnect from the network, or be rebooted, or reset. When the camera 128 is active again after being woken up, reset, or rebooted, the camera 128 receives a signal that the network connection to the camera 128 is active again. An example network adapter 1312 performing this function and an example network 1314 are illustrated and described in more detail with reference to FIG. 13. Responsive to receiving a power-on signal, the computer vision processor 108 sends a descriptor of the camera 128 to the server instance 1116. For example, when the camera 128 is powered on or resumes an Internet connection, the camera 128 sends an HTTP request to the server 132 with a camera_id. In another example, the descriptor can be a geographical location where the camera 128 is deployed, a floor of a building, or an alphanumeric descriptor denoted by camera_id.

In some embodiments, the camera 128 connects to a full-duplex communication channel that is generated by the server instance 116. For example, the server instance 116 receives a request from the camera, and initiates the full-duplex communication channel (e.g., WebSocket) between the camera 128 and the server based using HTTP. Further, the server instance 116 subscribes to a topic with camera_id as the name in the in-memory data structure store 120 (e.g., Redis). The full-duplex communication channel operates according to a computer communications protocol, providing full-duplex communication over a single TCP connection. For example, the WebSocket protocol standardized by the IETF as RFC 6455 can be used. In other embodiments, the full-duplex communication channel uses SSE, which provides a way to push data from the server 132 to the camera 128 over HTTP. The full-duplex communication channel generated references the descriptor and is for transmission of queries generated by the server instance 112. The queries are initiated by the user device 124. For example, the user device can initiate the query 148 in SQL or another language to the server instance 112 for the server instance 112 to place it in the in-memory data structure store 120. In another example, the query 148 can be initiated in a natural language for the server instance 112 to encode it into a structured language. In another example, the query 148 can be initiated using a graphical user interface as shown by FIGS. 4 and 5, or by menu controls as in FIGS. 6 and 7. The queries are encoded by the server instance 112. For example, the queries can be encoded into SQL or another language. In some embodiments, the server instance 112 encodes the query string as a part of a uniform resource locator (URL) that assigns values to specified parameters. A query string can include fields added to a base URL by an API running on the server instance 112.

When the user device 124 initiates a query 148, the server instance 112 receives it and encodes the query 148 as a key and a message. In some embodiments, the server instance 112 publishes the key and message to the in-memory data structure store 120 with the descriptor (e.g., camera_id) as the topic. The server instance 116 "listens" for the key from the in-memory data structure store 120. The server instance 116 receives the key and the message, and sends it to the camera 128, e.g., via WebSocket. The camera 128 receives the query 148 from the server instance 116 over the full-duplex communication channel. The query 148 specifies one or more of the attributes. For example, the query can specify clothing colors, apparent sex, the presence of backpacks, a particular person or vehicle (e.g., person 616 in FIG. 6), etc. For example, a query can specify "show when Matt Peterson entered the building & all instances of a person with a red shirt in the building."

In some embodiments, the computer vision processor 108 filters the attribute analytics using the one or more of the attributes to generate a response 152. The response 152 includes a portion of the traffic patterns (e.g., results 164) corresponding to a particular person or vehicle (e.g., person 616 in FIG. 6). The filtering is in response to the query and removes redundant or unwanted information from the attribute analytics prior to generating the response 152. The filtering thus increases the semantic signal-to-noise ratio. The results 164 of the filtering is used to generate the response 152 of FIG. 1 (e.g., portion of the traffic patterns corresponding to a particular person or vehicle).

The camera 128 sends the response 152 to the server instance 116. The response 152 includes the portion of the traffic patterns corresponding to the particular person or vehicle over the full-duplex communication channel for sending to the user device 124 by the server instance 112. The query-response process is asynchronous. The process for the camera 128 to respond with the response 152 can be out of order, e.g., the camera 128 can receive two messages and then respond with two messages out of order. The server instance 116 receives the response 152 and adds the result in the in-memory data structure store 120 (e.g., Redis) using received information (e.g., an alphanumeric string). The step of adding the result in the in-memory data structure store 120 is also asynchronous and does not block the step of the server instance 116 receiving the key and the message, and sending it to the camera 128. The server instance 112 receives the response 152 (e.g., including the results 164) and responds to the user device 124. In some embodiments, the server 132 implements the WebSocket protocol, using a raw WebSocket or Socket.IO.

When the camera 128 responds to the server instance 116 with a message containing the results 156, the response process is asynchronous and can be out of order, i.e., the camera 128 can receive two or more queries and return two or more responses. For example, the query 148 can be a first query, and the portion of the traffic patterns (response 152) is transmitted asynchronously with respect to a second query received by the camera 128 from the server instance 116 over the full-duplex communication channel. The server instance 116 receives the response 152 and adds the results 156 to the in-memory data structure store 120 using received information (e.g., an alphanumeric string). Similarly, the process of the server instance 116 receiving the response 152 and adding the results 156 to the in-memory data structure store 120 is also asynchronous and does not interfere with or block the step of the server instance 116 sending the queries 148 to the camera 128. The server instance 112 retrieves the results 156 from the in-memory data structure store 120 and sends them to the user device 124 for viewing by a user.

FIG. 2A illustrates a computer program for people and vehicle analytics on the edge, in accordance with one or more embodiments. The computer program is executed by the camera 128 to store hyperzooms by the camera 128 on a NoSQL key-value structure on cloud storage via the server instance 112. In some embodiments, the NoSQL key-value structure is a proprietary NoSQL database service that supports key-value and document data structures. In some embodiments, the NoSQL key-value structure resolves version conflicts and uses synchronous replication across multiple data centers for high durability and availability.

FIG. 2B illustrates an example database for people and vehicle analytics on the edge, in accordance with one or more embodiments. The example database is implemented on the storage medium 104 to store track metadata 168, counts of people and vehicles, attribute analytics, etc. The computer vision processor 108 generates track metadata 168 from the tracks for storing in the database located on the non-transitory computer-readable storage medium 104 of the camera 128. The track metadata 168 can be generated as structural metadata (e.g., metadata about containers of data, how compound objects are put together, types, versions, relationships, etc.), statistical metadata (e.g., the processes that collect, process, or produce statistical data, etc.), etc. The track metadata 168 can be stored in the form of a data structure including tables, fields, data types, indexes, or partitions in a relational engine, or as databases, dimensions, measures, and data mining models. In some embodiments the track metadata 168 defines a data model and the way it is accessed and presented to the users, with the reports, schedules, distribution lists, and user security rights. When a hyperzoom is stored for each detected person, a list of person IDs is stored in the database; the hyperzooms are persisted on cloud storage keyed by person ID, as described in more detail with reference to FIGS. 1, 10, and 11.

Figure 3:
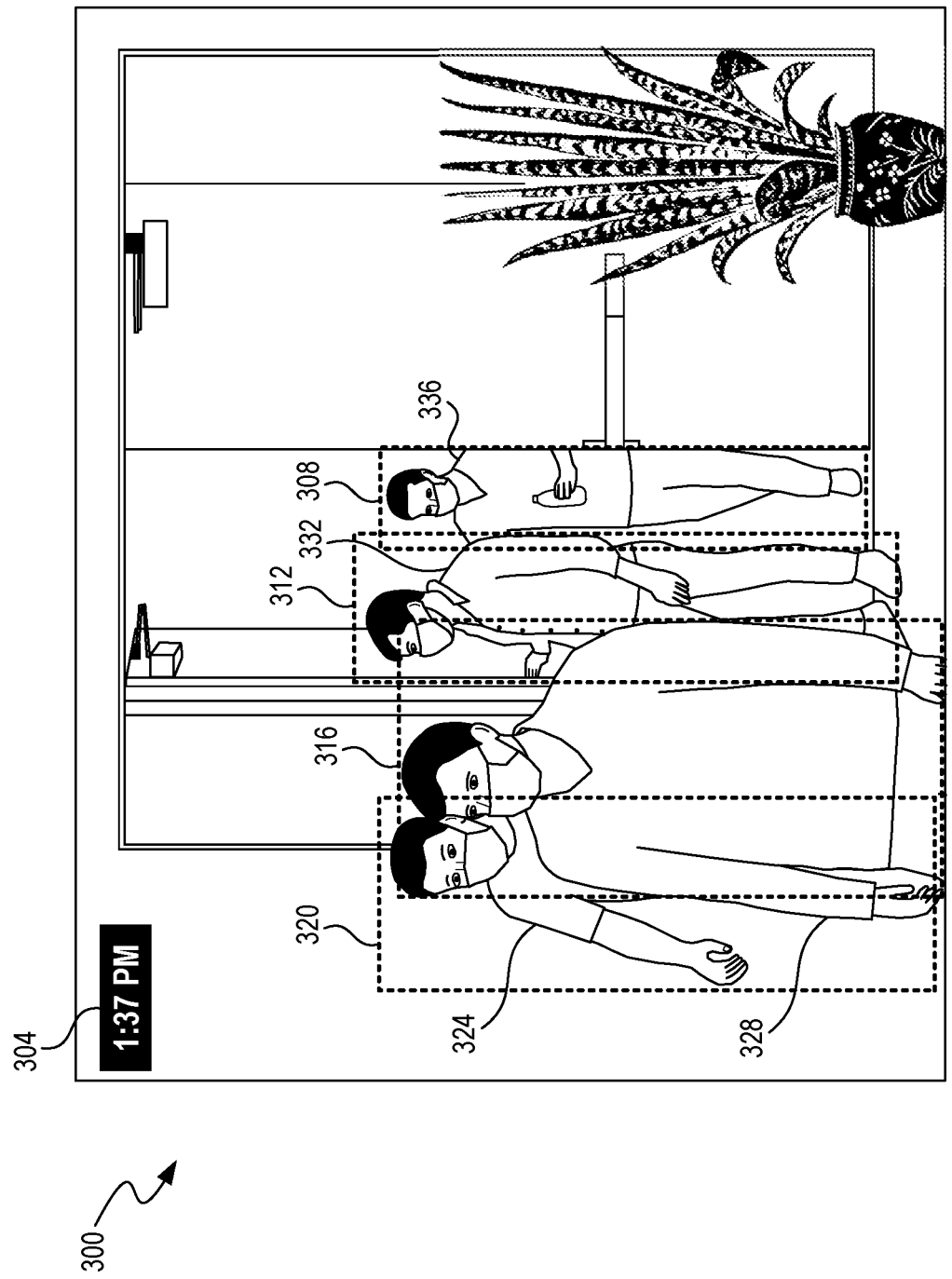
FIG. 3 is a drawing illustrating example hyperzooms for people and vehicle analytics on the edge, in accordance with one or more embodiments.

FIG. 3 is a drawing illustrating example hyperzooms for people and vehicle analytics on the edge, in accordance with one or more embodiments. FIG. 3 includes an environment 300 captured by image frames of the camera 128. The camera 128 disclosed herein generates hyperzooms to detect persons and vehicular activity from images captured by the camera 128.

The hyperzoom 320 refers to a bounding box that the camera 128 has zoomed into to describe the spatial location of an object, e.g., a person or a vehicle. In FIG. 3, the object is the person 324. The hyperzoom is generated from an image frame captured at time 304. Similarly, hyperzoom 316 depicts person 328, hyperzoom 312 depicts person 332, and hyperzoom 308 depicts person 336. Each hyperzoom is rectangular and can be specified by the x and y coordinates of the upper-left corner and the lower-right corner of the hyperzoom. In other embodiments, the camera 128 can specify the hyperzoom 320 by the (x,y) coordinates of the hyperzoom center, and the width and height of the hyperzoom 320. Each hyperzoom is used to track and detect activities of the moving objects in further image frames. The hyperzooms are used to detect humans and human activities, e.g., crowd traffic.

In some embodiments, the computer vision processor 108 assigns an identifier to the person 324 in the hyperzoom 320. The identifier is used to register new objects. For example, when a new object (e.g., person 324) enters or the same object (person 324) is detected again, the centroid tracking will register the new object with a unique ID, so that it becomes helpful for different applications. Once the object (person 324) is not in the image frame, the algorithm will de-register the object ID, stating that the object is not available or left the image frame. In some embodiments, the computer vision processor 108 predicts positions of the person 324, e.g., using a Kalman Filter from the hyperzoom 320. The Kalman Filter can be executed on the computer vision processor 108 and uses a series of measurements observed over time (e.g., the hyperzooms) to produce estimates of unknown variables (e.g., positions of persons) by estimating a joint probability distribution over the variables for each time frame (e.g., each image frame or hyperzoom). The computer vision processor 108 therefore produces estimates of the current state variables (e.g., positions of persons 324, 328, etc.) along with their uncertainties.

The computer vision processor 108 further detects instances of semantic objects (e.g., humans or cars) in the image frames or hyperzooms. In some embodiments, the detecting is performed using neural network-based approaches. For example, end-to-end object detection can be performed without specifically defining features using a convolutional neural network (CNN), as described in more detail with reference to FIGS. 11 and 12. In other embodiments, features are defined (e.g., using the Viola-Jones object detection framework based on Haar features, a Scale-invariant feature transform (SIFT), or Histogram of oriented gradients (HOG) features, etc.) using a support vector machine (SVM) to perform the classification, as illustrated in more detail with reference to FIG. 12. In some embodiments, responsive to detecting the person 324 in the hyperzoom 320, the computer vision processor 108 persists the identifier assigned to the person 324 in the hyperzoom 320. The computer vision processor 108 associates the hyperzoom 320 with the person 324.

FIG. 4 illustrates an example graphical user interface (GUI) for people and vehicle analytics on the edge, in accordance with one or more embodiments. The query 148 can be initiated using a graphical user interface as shown by FIGS. 4 and 5, or by menu controls as in FIGS. 6 and 7. The queries are encoded by the server instance 112. For example, the queries can be encoded into SQL or another language. In some embodiments, the server instance 112 encodes the query string as a part of a uniform resource locator (URL) that assigns values to specified parameters. A query string can include fields added to a base URL by an API running on the server instance 112. The query 148 can include search terms relating to high resolution analytics capture, people history, vehicle history, face matching and search, and person of interest notifications.

FIG. 5 illustrates an example GUI for people and vehicle analytics on the edge, in accordance with one or more embodiments. A query generated using the GUI shown by FIG. 5 can include search terms relating to high resolution image capture, face detection, and vehicle analytics.

Figure 6:
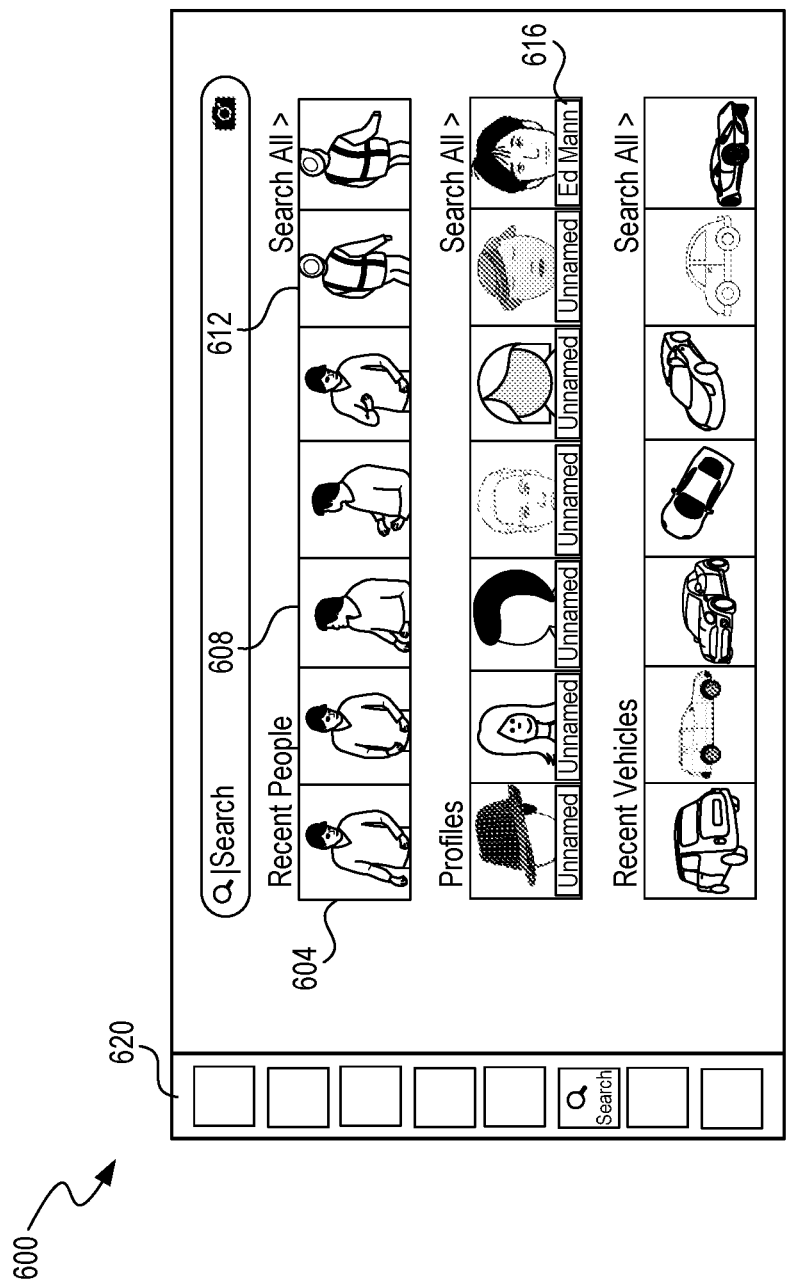
FIG. 6 is a block diagram illustrating an example graphical representation of results returned by a query, in accordance with one or more embodiments.

FIG. 6 is a block diagram illustrating an example graphical representation of results 156 returned by a query, in accordance with one or more embodiments. The example graphical representation is displayed on a screen 600 of the user device 124. The screen 600 of the user device 124 displays the graphical representation as a GUI that can be used to view the results 156 as well as initiate further queries. A menu bar 620 is displayed on the left side of the screen 600 to initiate queries. In the top row of the example graphical representation, a set of detected persons 604, 608, 612 is displayed. In some embodiments, intermediate results, such as in FIG. 6, can be displayed. The persons shown in FIG. 6 have been detected from recent hyperzooms. Some of the detections are duplicates, i.e., the persons 604, 608 are the same human. The computer vision processor 108 can filter out these duplicates and assign the same identifier to them, such that no duplicates are displayed. The person 612 is a different human than the person 604, 608. The user device 124 can be used to initiate a query searching for the known person 616 from among all detected persons in a particular time frame. Similarly, the bottom row in FIG. 6 shows functionality for searching for vehicles.

Figure 7:
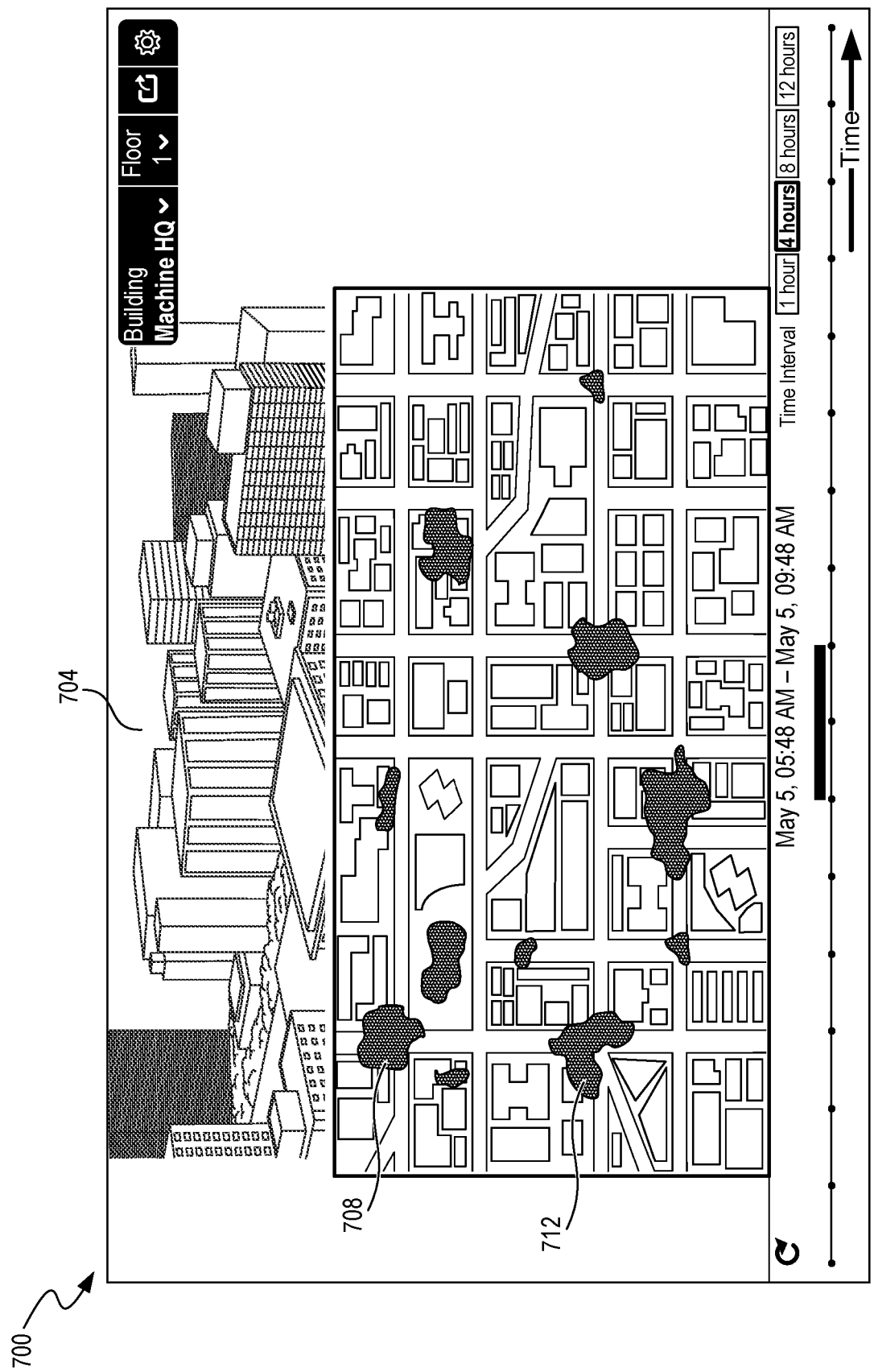
FIG. 7 is a drawing illustrating a heatmap for people and vehicle analytics on the edge, in accordance with one or more embodiments.

FIG. 7 is a drawing illustrating a heatmap 700 for people and vehicle analytics on the edge, in accordance with one or more embodiments. In some embodiments, to respond to the query 148, the computer vision processor 108 generates a heatmap using the track metadata. The heatmap 700 is a data visualization technique that shows the density of people or vehicles as color in two dimensions. The variation in color can be by hue or intensity, giving obvious visual cues to the user device 124 about how the phenomenon is clustered or varies over space. In some embodiments, the heatmap provides information on where people have been on a floor plan (e.g., of the buildings 704) during a selected time range. For example, a darker color (e.g., in shape 708) indicates more people traffic, while a lighter color (e.g., in shape 712) indicates less people traffic. The time range being viewed on the people heatmap can be changed, e.g., by moving a timeline back and forth, changing the date and time using a calendar function, or skipping forward and backward with skip buttons. The time interval can be changed using buttons on the right side of the timeline. The camera 128 sends the heatmap 700 to the server instance 116 over the full-duplex communication channel. The heatmap is for sending to the user device 124 by the server instance 112.

Figure 8:
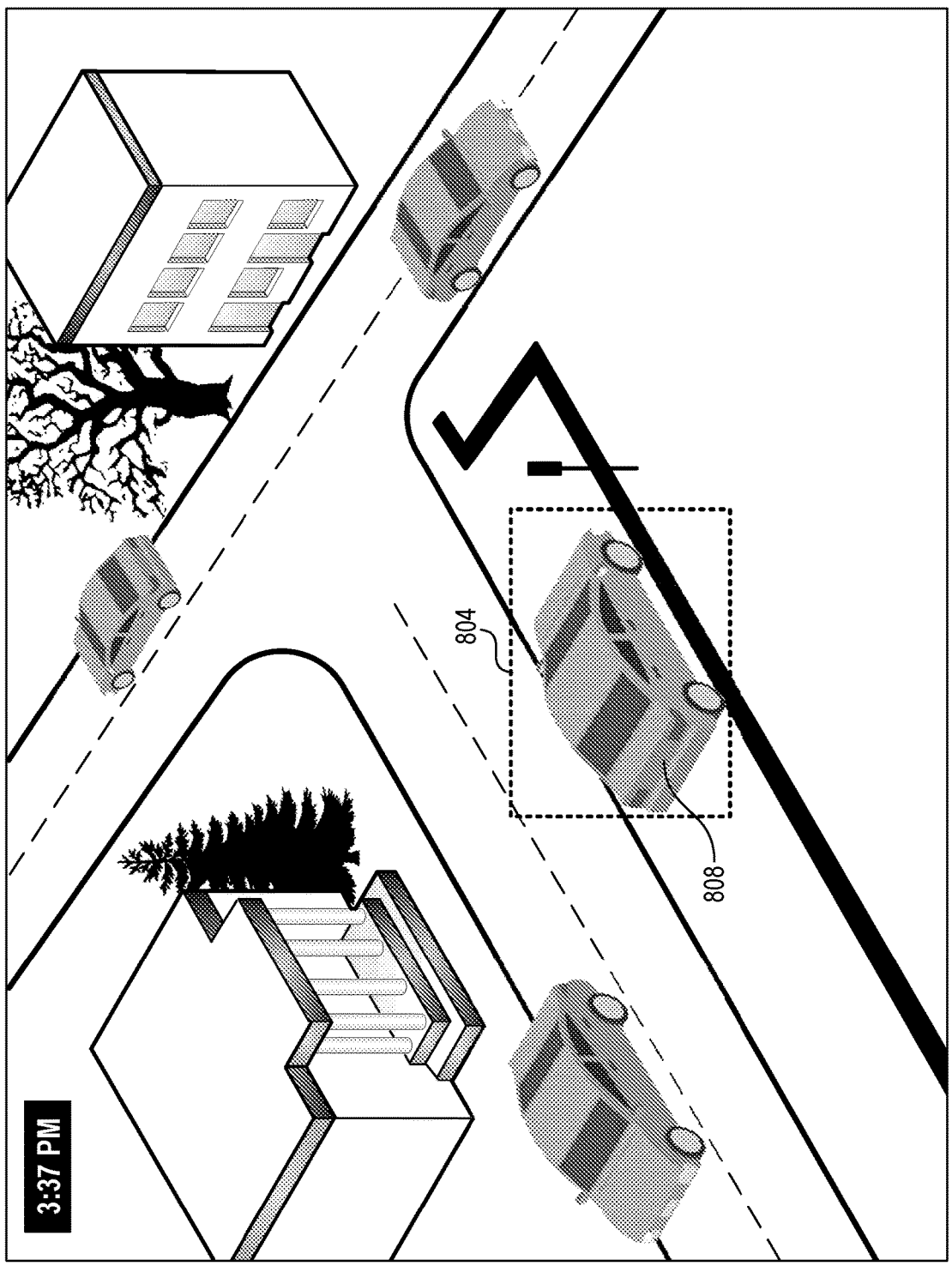
FIG. 8 is a drawing illustrating an example hyperzoom for vehicle analytics on the edge, in accordance with one or more embodiments.

FIG. 8 is a drawing illustrating an example hyperzoom for vehicle analytics on the edge, in accordance with one or more embodiments. The camera 128 extracts attributes of a vehicle 808 from the hyperzoom 804 generated from the image frame 800 captured by the camera 128. The hyperzoom 804 represents traffic patterns of the vehicle 808. The extracting can be performed using a feature extractor of an on-camera convolutional neural network (CNN) including an inverted residual structure. The attributes include at least a color of the vehicle 808. The camera 128 generates attribute analytics by executing mobile semantic segmentation models of the CNN based on the attributes while obviating network usage by the camera 128. The camera 128 stores the attribute analytics in a database located on the camera 128. The attribute analytics are indexed by the attributes. The camera 128 receives a query 148 from the server instance 116 (see FIG. 1) over a full-duplex communication channel. The query 148 specifies one or more of the attributes. The camera 128 transmits a portion of the traffic patterns filtered by the one or more of the attributes over the full-duplex communication channel for sending to the user device 124 by the server instance 112.

Figure 9:
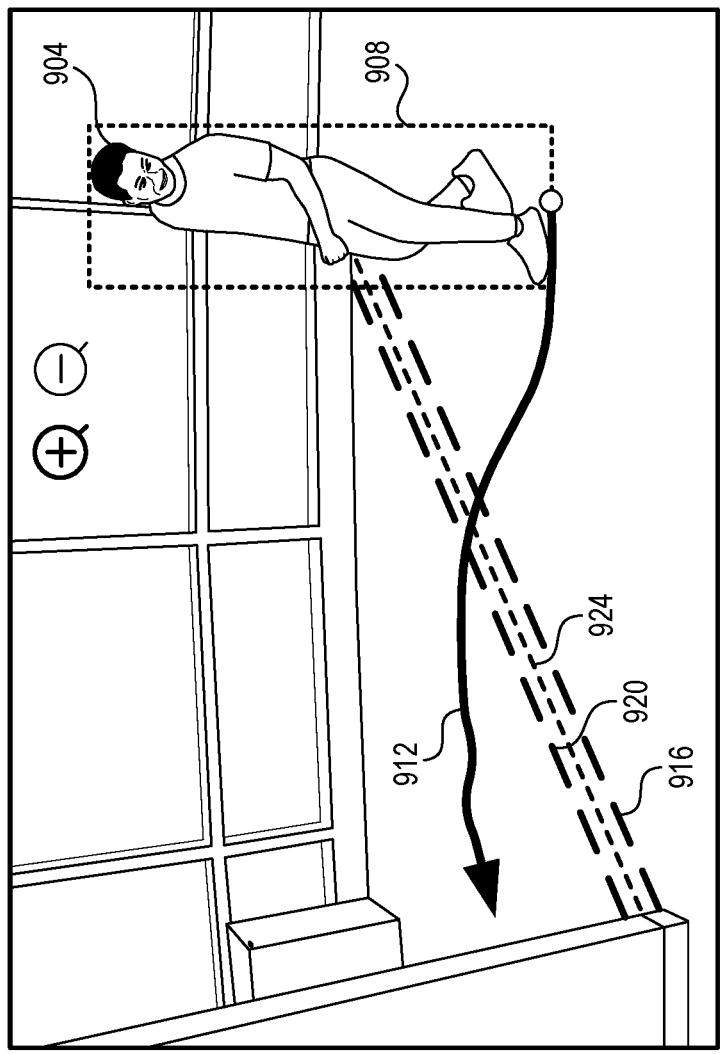
FIG. 9 is a diagram illustrating an example of line-crossing detection for people and vehicle analytics on the edge, in accordance with one or more embodiments.

FIG. 9 is a diagram illustrating an example of line-crossing detection for people and vehicle analytics on the edge, in accordance with one or more embodiments. The camera 128 (see FIG. 1) implements line-crossing detection using tracklets of people or vehicles and a line 924 defined by the user device 124. For example, a user can use a GUI to define coordinates of the line 924 on the user device 124 (see FIG. 1).

In some embodiments, the computer vision processor 108 generates tracks 912 of a person or vehicle (e.g., person 904) from hyperzooms (e.g., hyperzoom 908) depicting the person or vehicle. Example methods for track generation are described in more detail with reference to FIGS. 1 and 10. The hyperzooms are generated from image frames (e.g., image frame 900) captured by the camera 128. For example, the person 904 is detected and a centroid is marked on the detected person 904. The movement of the marked centroid is tracked. In some embodiments, object tracking methods, such as deep sort, centroid tracker, channel and spatial reliability tracker (CSRT), kernel correlation filter (KCF), or camshift, that track a detected object by comparing the similarity of detected objects with each other in each processed frame are used.

The computer vision processor 108 receives coordinates of the line 924 from the server instance 116 (see FIG. 1) over a full-duplex communication channel. The coordinates of the line 924 are defined by the user device 124 communicably coupled to the server instances 112, 116. The computer vision processor 108 defines a first parallel line 916 and a second parallel line 920 spaced from the line 924 and positioned on different sides of the line 924. The computer vision processor 108 determines a first position of the person 904 relative to the line from the image frames captured by the camera 128. For each trajectory of a person or vehicle currently in memory on the camera 128, the camera 128 keeps track of which side of the line 924 the person or vehicle is on. The camera 128 captures an image frame of the person or vehicle. The image frame is captured after the image frames. For each detection box (e.g., hyperzoom 908), the mid-point of the lower edge is tracked.

The computer vision processor 108 determines a second position of the person 904 relative to the line 924 from the image frame captured after the image frames. If, in the image frame, the person 904 is close to the line 924 or on the same side as before, the camera 128 does not record a change. If the side of the detection changes, the camera 128 records the crossing in the database on the storage medium 104 (see FIG. 1). When the tracked box crosses the line 924 and is farther from the line 924 than the parallel line 920, a crossing detection is recorded. For example, the computer vision processor 108 determines that the person 904 has crossed the line 924 from a first side of the first parallel line 916 to a second side of the second parallel line 920 based on a difference between the first position and the second position and/or the tracks 912. Responsive to determining that a first distance between the second position and the second parallel line 920 is smaller than a second distance between the second position and the line 924, the computer vision processor 108 stores track metadata 168 describing that the person 904 has crossed the line 924 in a key-value database located on the storage medium 104 (see FIG. 1) of the camera 128.

In some embodiments, the computer vision processor 108 determines the bounding box coordinates and computes a centroid for the person 904. For example, the bounding box coordinates are determined as $x_{min}$, $y_{min}$, $x_{max}$, and $y_{max}$. The $(x_{center}, y_{center})$ coordinates for the person 904 in the image frame 900 are determined. The centroid is determined as: $X_{cen}=(x_{min}+x_{max})/2$ and $Y_{cen}=(y_{min}+y_{max})/2$, where $x_{min}$, $y_{min}$, $x_{max}$, and $y_{max}$ are the bounding box coordinates. The camera 128 determines a Euclidian distance between a new detected bounding box (from the image frame captured after the image frames) and the person 904. The centroid for the person 904 is updated. After determining the Euclidian distance between the new detected bounding box and the last position, the camera 128 updates the position of the centroid in the image frame, thus tracking the person 904. In some embodiments, the camera 128 determines a direction of centroid movement (e.g., track 912). The camera 128 further counts the number of people crossing the line 924. Based on the counting, the camera 128 increments a line-crossing count in the track metadata 168.

The camera 128 receives a query 148 from the server instance 116 over the full-duplex communication channel. The query 148 requests a count of a number of times the person 904 has crossed the line 924. The computer vision processor 108 generates a response 152 to the query 148 from the track metadata 168 stored in the key-value database. The camera 128 sends the response 152 to the server instance 116 over the full-duplex communication channel. The response 152 is for sending to the user device 124 by the server instance 112.

FIG. 10 is a flow diagram illustrating an example process for people and vehicle analytics on the edge, in accordance with one or more embodiments. In some embodiments, the process of FIG. 10 is performed by the camera 128 illustrated and described in more detail with reference to FIG. 1. In other embodiments, the process of FIG. 10 is performed by a computer system, e.g., the example computer system 1300 illustrated and described in more detail with reference to FIG. 13. Particular entities, for example, the computer vision processor 108 or the server 132, perform some or all of the steps of the process in other embodiments. The computer vision processor 108 and the server 132 are illustrated and described in more detail with reference to FIG. 1. Likewise, embodiments can include different and/or additional steps, or perform the steps in different orders.

In step 1004, the computer vision processor 108 of the camera 128 generates hyperzooms for persons or vehicles from image frames captured by the camera 128. In some embodiments, the computer vision processor 108 is a system-on-a-chip (SoC) that performs image processing, video encoding, and CVflow™ computer vision processing. In some embodiments, the architecture of the computer vision processor 108 provides deep neural network (DNN) processing for computer vision applications and the processes of FIGS. 10 and 11. The computer vision processor 108 can extract maximum image detail in high contrast scenes, e.g., to extract attributes of people and vehicles from hyperzooms.

A hyperzoom refers to a bounding box that the camera 128 has zoomed into to describe the spatial location of an object, e.g., a person or a vehicle. The hyperzoom is rectangular and can be specified by the x and y coordinates of the upper-left corner and the lower-right corner of the hyperzoom. In other embodiments, the camera 128 specifies a hyperzoom by the (x,y) coordinates of the hyperzoom center, and the width and height of the hyperzoom. The camera 128 disclosed herein generates hyperzooms to detect persons and vehicular activity from images captured by the camera 128. The hyperzoom that bounds each object in the image frames is used to track and detect activities of the moving objects in further frames. The hyperzooms are used to detect humans and human activities, e.g., crowd traffic. The hyperzooms captured include at least a first hyperzoom and a second hyperzoom. The first hyperzoom is associated with the persons or vehicles.

In some embodiments, the computer vision processor 108 assigns identifiers to the persons or vehicles in the first hyperzoom. The identifiers are used to register new objects. For example, when a new object enters or the same object is being detected, the centroid tracking will register the new object with a unique ID, so that it becomes helpful for different applications. Once the object is not in the frame, the algorithm will de-register the object ID, stating that the object is not available or left the image frame.

In step 1008, the computer vision processor 108 tracks traffic patterns of the persons or vehicles on the edge while obviating network usage by the camera 128. An example network adapter 1312 performing this function and an example network 1314 are illustrated and described in more detail with reference to FIG. 13. The term "on the edge" refers to edge-based computing or edge processing. In the embodiments described herein, the execution of aggregation, data manipulation, bandwidth reduction, and other logic is performed on the edge (directly on the wireless camera 128). Network usage is obviated because the image processing is not performed on a server or other external device. The traffic patterns are tracked as follows.

In step 1012, the computer vision processor 108 predicts positions of the persons or vehicles, e.g., using a Kalman Filter from the first hyperzoom. The Kalman Filter can be executed on the computer vision processor 108 and uses a series of measurements observed over time (e.g., the hyperzooms) to produce estimates of unknown variables (e.g., positions of persons) by estimating a joint probability distribution over the variables for each time frame (e.g., each image frame or hyperzoom). In step 1012, the computer vision processor 108 therefore produces estimates of the current state variables (e.g., positions of persons) along with their uncertainties.

In step 1016, the computer vision processor 108 detects the persons or vehicles in the second hyperzoom. The computer vision processor 108 detects instances of semantic objects (e.g., humans or cars) in the image frames or hyperzooms. In some embodiments, the detecting is performed using neural network-based approaches. For example, end-to-end object detection can be performed without specifically defining features using a convolutional neural network (CNN), as described in more detail with reference to FIGS. 11 and 12. In other embodiments, features are defined (e.g., using the Viola-Jones object detection framework based on Haar features, a scale-invariant feature transform (SIFT), or histogram of oriented gradients (HOG) features, etc.) and using a support vector machine (SVM) to perform the classification, as illustrated in more detail with reference to FIG. 12. In some embodiments, responsive to detecting the persons or vehicles in the second hyperzoom, the computer vision processor 108 persists the identifiers in the second hyperzoom. The computer vision processor 108 associates the second hyperzoom with the persons or vehicles.

In step 1020, the computer vision processor 108 updates the positions of the persons or vehicles based on detecting the persons or vehicles in the second hyperzoom. Once the outcome of the next measurement (from step 1016) is observed, the estimates of step 1012 are updated using a weighted average, with more weight being given to estimates having greater certainty. The first hyperzoom is removed from the camera 128 so that storage in the camera 128 is freed up and the processing in FIG. 10 is performed on the edge without sending data to the server 132 for processing. Thus network use is obviated.

In step 1024, the computer vision processor 108 generates tracks of the persons or vehicles based on the updated positions. In some embodiments, the computer vision processor 108 generates the tracks using deep sort or centroid tracking by comparing the similarity of detected objects with each other in each processed hyperzoom. If a person or vehicle has the same similarity metric throughout the frame, the computer vision processor 108 generates a track for the object throughout a sequence of hyperzooms and retains the same identifier for the object. The consistent identifier for a particular object enables the people and vehicle counting operation.

In some embodiments, the computer vision processor 108 generates the tracks using the deep sort method, which increases the number of image frames processed per second to about 10 frames per second (fps). In other embodiments, centroid tracking is used. In centroid tracking, the computer vision processor 108 computes a centroid from coordinates of a hyperzoom. For example, the computer vision processor 108 uses coordinates of the hyperzoom ($x_{min}$, $y_{min}$, $x_{max}$, and $y_{max}$) and determines ($x_{center}$, $y_{center}$) coordinates for each of the detected objects in each frame. The centroid can be determined as $X_{cen}=(x_{min}+x_{max})/2$ and $Y_{cen}=(y_{min}+y_{max})/2$, where $x_{min}$, $y_{min}$, $x_{max}$, and $y_{max}$ are the hyperzoom coordinates. The computer vision processor 108 determines a Euclidian distance between the second hyperzoom and the first hyperzoom. After determining the Euclidian distance, the computer vision processor 108 updates the position of the centroid in the frame, thereby tracking the object. The second hyperzoom is removed from the camera 128 to reduce the amount of data stored and enable edge processing.

In some embodiments, the computer vision processor 108 expresses the tracks as image positions measured in pixel units relative to the upper-left corner of the image frame. For example, in a 320×240 pixel image, the upper-left corner is at image position (0.0, 0.0) and the lower-right corner is at (320.0, 240.0). Each physical object within the image frame is assigned world coordinates measured in scaled world units (e.g., meters) relative to a specified reference frame. In some embodiments, a coordinate system or set of transformations used to convert image positions into world coordinates is used. The coordinate system is used to define the tracks for each frame of the video as the scale (image units per world unit), origin (image position of the reference frame origin), and angle (counterclockwise angle from the image x-axis to the world x-axis).

In step 1028, the computer vision processor 108 generates track metadata 168 from the tracks for storing in a database located on a non-transitory computer-readable storage medium 104 of the camera 128. The track metadata 168 can be generated as structural metadata (e.g., metadata about containers of data, how compound objects are put together, types, versions, relationships, etc.), statistical metadata (e.g., the processes that collect, process, or produce statistical data, etc.), etc. The track metadata 168 can be stored in the form of a data structure including tables, fields, data types, indexes, or partitions in a relational engine, or as databases, dimensions, measures, and data mining models. In some embodiments the track metadata 168 defines a data model and the way it is accessed and presented to the users, with the reports, schedules, distribution lists, and user security rights.

The non-transitory computer-readable storage medium 104 is any lightweight, mobile, embedded memory or memory card in the camera that has rapid read/write rates, enabling edge processing. In some embodiments, a secure digital (SD) card or micro SD card is used. SD is a proprietary non-volatile memory card format developed by the SD Association (SDA) for use in portable devices. A microSD card is a removable miniaturized SD flash memory card, sometimes called T-Flash or TransFlash. TransFlash cards are electrically compatible with larger SD cards. In other embodiments, Compact Flash (CF) cards that can store 256 GB+ data with 160 Mb/second access times are used. In other embodiments, XQD memory cards designed for high speed read and write, and suitable for high resolution (4K) video recording are used. In other embodiments, Memory Sticks (MS) that provide flexible storage, such as Memory Stick Duo, Memory Stick PRO, Memory Stick PRO-HG, or Memory Stick Micro M2, are used.

In some embodiments, the database is a key-value database located on the non-transitory computer-readable storage medium 104. A key-value database stores the track metadata 168 as a collection of key-value pairs in which a key serves as a unique ID. The key-value database or key-value store is implemented for storing, retrieving, and managing the track metadata 168 as associative arrays in a data structure, more commonly as a dictionary or hash table. The track metadata 168 is stored and retrieved using a key that uniquely identifies the record, and is used to find the data within the database. In some embodiments, the database is a relational database (RDB). An RDB predefines the data structure in the database as a series of tables containing fields with well-defined data types. Exposing the data types to the database program allows it to apply a number of optimizations.

In some embodiments, the database stores the tracks as byte arrays on the non-transitory computer-readable storage medium 104. For example, the database can be a lightning memory-mapped database (LMDB) that stores arbitrary key/data pairs as byte arrays, has a range-based search capability, supports multiple data items for a single key, and has a special mode for appending records without checking for consistency. The database can also be used concurrently in a multi-threaded or multi-processing environment, with read performance scaling linearly by design. Multiple queries 148 can simultaneously open and use the database, as a means to scale up performance.

In some embodiments, the database stores the tracks in immutable row partitions in sorted order. For example, the database can include an SSTable, which provides a persistent, ordered immutable map from keys to values, where both keys and values are arbitrary byte strings. Operations can be provided to look up the value associated with a specified key, and to iterate over all key-value pairs in a specified key range. A block index (stored at the end of the SSTable) can be used to locate blocks; the index is loaded into memory when the SSTable is opened.

In some embodiments, the database stores the tracks in a relational database management system (RDBMS) on the non-transitory computer-readable storage medium 104. For example, the database can be a relational database that organizes data into one or more data tables in which data types may be related to each other. The relations structure the data. The queries 148 create, modify, and extract data from the relational database, as well as control user access to the database.

The tracks are removed from the camera 128 to reduce storage requirements on the camera 128 after metadata generation. Thus edge processing is enabled. In some embodiments, the tracks are stored by the camera 128 on a NoSQL key-value structure on cloud storage via the server instance 112 (sometimes referred to as a "second server instance"). The server instances 112, 116 are virtual machines running workloads, e.g., in the cloud. The server instance 116 is sometimes referred to as a "first server instance." For example, the server instances 112, 116 can be launched in a specified cloud infrastructure. In some embodiments, the server instance 112 is a collection of SQL Server databases run by the server 132. The details of each server instance 112, 116 can be viewed on a service console which can be web-based or command-line based. The server instances 112, 116 can be controlled or managed separately. Each SQL Server instance has its own ports, databases, and logins. The multiple server instances 112, 116 provide advantages such as stability and backup for the camera 128. The system 100 itself can transfer the load in case of unprecedented issues such as data loss or system crashes. For example, the server instance 116 can take up the work of the server instance 112 if affected.

In some embodiments, the NoSQL key-value structure is a proprietary NoSQL database service that supports key-value and document data structures. In some embodiments, the NoSQL key-value structure resolves version conflicts and uses synchronous replication across multiple data centers for high durability and availability. In some embodiments, the computer vision processor 108 generates a visualization of the tracks. The visualization provides options for displaying or viewing the object tracks. For example, the color of each track can be a constant color for all tracks, a random color from a color map can be chosen for each track, a track color can be selected based on the x velocity, y velocity, or magnitude of the velocity, etc. A number of points of each track can be changed or every point of every track can be displayed. Lines can be drawn through points and the width of the lines can be changed. The camera 128 stores the tracks and the visualization in the NoSQL key-value structure on cloud storage via the server instance 116. The visualization is for sending to the user device 124 by the server instance 112.

In step 1032, the camera 128 receives a query 148 from the server instance 116 over a full-duplex communication channel. The query is initiated by the user device 124. For example, the user device 124 can initiate the query 148 in SQL or another language to the server instance 112 for the server instance 112 to place it in the in-memory data structure store 120. In another example, the query 148 can be initiated in a natural language for the server instance 112 to encode it into a structured language. In another example, the query 148 can be initiated using a graphical user interface as shown by FIGS. 4 and 5, or by menu controls as in FIGS. 6 and 7. The queries are encoded by the server instance 112. For example, the queries can be encoded into SQL or another language. In some embodiments, the server instance 112 encodes the query string as a part of a uniform resource locator (URL) that assigns values to specified parameters. A query string can include fields added to a base URL by an API running on the server instance 112.

The full-duplex communication channel operates according to a computer communications protocol, providing full-duplex communication over a single TCP connection. For example, the WebSocket protocol standardized by the IETF as RFC 6455 can be used. In other embodiments, the full-duplex communication channel uses SSE, which provides a way to push data from the server 132 to the camera 128 over HTTP. The query 148 is a request for data or information from the database, e.g., generated as results returned by SQL or as pictorials, graphs, or complex results, e.g., trend analyses from data-mining tools.

The query 148 is encoded as a key and a message. The key is a string or array of structured data used to filter the track metadata stored in the database on the non-transitory computer-readable storage medium 104. In some embodiments, the key has multiple components, specified as an ordered list. A "major" key identifies a portion of the track metadata and consists of the leading components of the key. The subsequent components are called "minor keys." The organization can be similar to a directory path specification in a file system (e.g., /Major/minor1/minor2/). For example, the key can specify a time range of the hyperzooms, a geographic location the hyperzooms were shot in, a set of days in a week (e.g., Mondays and Wednesdays only), coordinates of a line that people or vehicles are crossing (see FIG. 9), etc. The message specifies a characteristic of the traffic patterns of people and vehicles captured by the camera 128. For example, the message can refer to a count of people, a count of vehicles, a heatmap of people or vehicles (see FIG.

7), a count of people or vehicles crossing a line in a particular direction (see FIG. 9), etc. The message can be encoded into one of several different query languages, e.g., SQL, DMX, Datalog, and AQL, etc. The results 164 come from filtering the database on the storage medium 104 using a key and the message.

In some embodiments, to respond to the query 148, the computer vision processor 108 generates a heatmap using the track metadata. The heatmap is a data visualization technique that shows the density of people or vehicles as color in two dimensions. The variation in color can be by hue or intensity, giving obvious visual cues to the user device 124 about how the phenomenon is clustered or varies over space. In some embodiments, the heatmap provides information on where people have been on a floor plan during a selected time range (see FIG. 7). For example, a darker color indicates more people traffic, while a lighter color indicates less people traffic. The time range being viewed on the people heatmap can be changed, e.g., by moving a timeline back and forth, changing the date and time using a calendar function, or skipping forward and backward with skip buttons. The time interval can be changed using buttons on the right side of the timeline (see FIG. 7). The camera 128 sends the heatmap to the server instance 116 over the full-duplex communication channel. The heatmap is for sending to the user device 124 by the server instance 112.

In step 1036, the computer vision processor 108 generates a response 152 to the message based on results 164 of filtering the track metadata using the key and the characteristic of the traffic patterns. For example, the response 152 can contain detections of particular people, faces (see FIG. 6) or filtered results 156 based on clothing color, apparent sex, and the presence of backpacks. The response 152 can display a number indicating the number of people detected in an image frame. The response 152 can display lines that provide a sense of which parts of a clip contain the most people activity. In step 1040, the camera 128 transmits the response 152 to the server instance 116 over the full-duplex communication channel. The response 152 is for sending to a user device 124 by the server instance 112. The user device 124 is a smartphone, laptop, desktop, tablet, etc., implemented using at least some parts of the computer system 1300 of FIG. 13.

FIG. 11 is a flow diagram illustrating an example process for people and vehicle analytics on the edge, in accordance with one or more embodiments. In some embodiments, the process of FIG. 11 is performed by the camera 128 illustrated and described in more detail with reference to FIG. 1. In other embodiments, the process of FIG. 11 is performed by a computer system, e.g., the example computer system 1300 illustrated and described in more detail with reference to FIG. 13. Particular entities, for example, the computer vision processor 108 or the server 132, perform some or all of the steps of the process in other embodiments. The computer vision processor 108 and the server 132 are illustrated and described in more detail with reference to FIG. 1. Likewise, embodiments can include different and/or additional steps, or perform the steps in different orders.

In step 1104, the computer vision processor 108 of the camera 128 extracts attributes of persons or vehicles from hyperzooms generated from image frames captured by the camera 128. Hyperzooms are described in more detail with reference to FIG. 10. The extraction of features and attributes (e.g., features 1212) is described in more detail with reference to FIG. 12. The attributes can include clothing color, apparent sex, the presence of backpacks, a make or model of vehicles, vehicle color, etc. The hyperzooms represent traffic patterns of the persons or vehicles. In some embodiments, the extracting is performed using a feature extractor of an on-camera convolutional neural network (CNN) (see FIG. 12) including an inverted residual structure. For example, in the CNN, the shortcut connections are between thin bottleneck layers. An intermediate expansion layer uses lightweight depthwise convolutions to filter features as a source of non-linearity. An example feature extraction module 1208 is illustrated and described in more detail with reference to FIG. 12.

In step 1108, the computer vision processor 108 generates mobile semantic segmentation models of the CNN using the hyperzooms and the attributes. In some embodiments, the mobile semantic segmentation models cluster parts of an image frame or hyperzoom together when they belong to the same object class. Semantic segmentation is a form of pixel-level prediction because each pixel in the hyperzoom image is classified according to an attribute or category. The models are referred to as mobile because they are executed on the computer vision processor 108 itself to provide edge computing capabilities. In some embodiments, generating the mobile semantic segmentation models includes training, by the computer vision processor, the CNN using the hyperzooms and the attributes. Training an example machine learning model 1216 is illustrated and described in more detail with reference to FIG. 12. For example, the attributes can be used as the features 1212, the hyperzooms can be used as the training data 1220, and the image frames can be used as the validation set 1232, as illustrated and described in more detail with reference to FIG. 12. In some embodiments, generating the mobile semantic segmentation models comprises classification (making a prediction for a whole input), localization/detection (providing information regarding the spatial location of the classes), or fine-grained inference by making dense predictions inferring labels for every pixel, so that each pixel is labeled with the class of its enclosing object or region.

In step 1112, the computer vision processor 108 generates an index table for a NoSQL key-value structure on cloud storage. An example NoSQL key-value structure is described in more detail with reference to FIG. 10. In some embodiments, the index table uses primary keys to uniquely identify each hyperzoom or track, and secondary indexes to provide more querying flexibility. The index table is referenced by the attributes. In some embodiments, the index table accelerates application accesses and data retrieval, and supports faster performance by reducing application lag. In some embodiments, a secondary index holds an attribute subset and an alternate key. The second index can be used through either a query or scan operation.

In some embodiments, the hyperzooms are keyed or indexed by a camera_id and time (milliseconds). More than one hyperzoom can be persisted for the same person. In other embodiments, only one hyperzoom is persisted for each tracked person. An index table, e.g., a DynamoDB table, is used and called "object_tracking_hyperzoom" that is keyed by camera_id and object_id. The index table includes a path of the hyperzoom on cloud storage.

In step 1116, the camera 128 stores the hyperzooms in the NoSQL key-value structure on the cloud storage via the server instance 116. The index table includes pointers to the hyperzooms in the NoSQL key-value structure. For example, the index table can include a partition key and a sort key. To free up storage on the camera 128, the hyperzooms are removed from the camera 128.

In step 1120, the computer vision processor 108 generates attribute analytics by executing the mobile semantic segmentation models based on the attributes while obviating network usage by the camera 128. Thus edge processing is enabled. In some embodiments, a "Person History" feature is enabled such that the camera 128 performs people detection as well as more complex analytics, such as the ability to search for faces, and for people by clothing color. In some embodiments, all detected people across different cameras can be displayed (see FIG. 6). In some embodiments, person-of-interest (POI) alerts can be enabled that provide the ability to identify and search for individuals in the camera footage, allowing a user device 124 to quickly find meaningful events and save time during critical investigations.

In step 1124, the computer vision processor 108 stores the attribute analytics in a key-value database located on the non-transitory computer-readable storage medium 104 of the camera 128. Example key-value databases are described in more detail with reference to FIG. 10. The attribute analytics are indexed by the attributes. The steps 1104, 1108, 1012, 1120, and 1124 are performed at the edge, on the camera 128. In some embodiments, the camera 128 can go into a sleep mode, disconnect from the network, or be rebooted, or reset. When the camera 128 is active again after being woken up, reset, or rebooted, the camera 128 receives a signal that the network connection to the camera 128 is active again. An example network adapter 1312 performing this function and an example network 1314 are illustrated and described in more detail with reference to FIG. 13. Responsive to receiving the signal, the computer vision processor 108 sends a descriptor of the camera 128 to the server instance 116. For example, the descriptor can be a geographical location where the camera 128 is deployed, a floor of a building, or an alphanumeric descriptor denoted by camera_id.

In some embodiments, the camera 128 connects to a full-duplex communication channel that is generated by the server instance 116. The full-duplex communication channel operates according to a computer communications protocol, providing full-duplex communication over a single TCP connection. For example, the WebSocket protocol standardized by the IETF as RFC 6455 can be used. In other embodiments, the full-duplex communication channel uses SSE, which provides a way to push data from the server 132 to the camera 128 over HTTP. The full-duplex communication channel generated references the descriptor and is for transmission of queries generated by the server instance 112. The queries are initiated by the user device 124. For example, the user device can initiate the query 148 in SQL or another language to the server instance 112 for the server instance 112 to place it in the in-memory data structure store 120. In another example, the query 148 can be initiated in a natural language for the server instance 112 to encode it into a structured language. In another example, the query 148 can be initiated using a graphical user interface as shown by FIGS. 4 and 5, or by menu controls as in FIGS. 6 and 7. The queries are encoded by the server instance 112. For example, the queries can be encoded into SQL or another language. In some embodiments, the server instance 112 encodes the query string as a part of a uniform resource locator (URL) that assigns values to specified parameters. A query string can include fields added to a base URL by an API running on the server instance 112.

In step 1128, the computer vision processor 108 receives a query 148 from the server instance 116 over a full-duplex communication channel. The query 148 specifies one or more of the attributes. For example, the query can specify clothing colors, apparent sex, the presence of backpacks, a particular person or vehicle (e.g., person 616 in FIG. 6), etc. Example query structures are described in more detail with reference to FIG. 10. For example, a query can specify "show when Matt Peterson entered the building & all instances of a person with a red shirt in the building."

In step 1132, the computer vision processor 108 filters the attribute analytics using the one or more of the attributes to generate a response 152. The response 152 includes a portion of the traffic patterns corresponding to a particular person or vehicle (e.g., person 616 in FIG. 6). The filtering is in response to the query and removes redundant or unwanted information from the attribute analytics prior to generating the response 152. The filtering thus increases the semantic signal-to-noise ratio. The results 164 of the filtering make up the response 152 of FIG. 1 (e.g., portion of the traffic patterns corresponding to a particular person or vehicle).

In step 1136, the camera 128 sends a response 152 to the server instance 116. The response 152 includes the portion of the traffic patterns corresponding to the particular person or vehicle over the full-duplex communication channel for sending to the user device 124 by the server instance 112. The query-response process is asynchronous. When the camera 128 responds to the server instance 116 with a message containing the results 156, the response process is asynchronous and can be out of order, i.e., the camera 128 can receive two or more queries and return two or more responses. For example, the query can be a first query, and the portion of the traffic patterns (response 152) is transmitted asynchronously with respect to a second query received by the camera 128 from the server instance 116 over the full-duplex communication channel. The server instance 116 receives the response 152 and adds the results 156 to the in-memory data structure store 120 using a received key. Similarly, the process of the server instance 116 receiving the response 152 and adding the results 156 to the in-memory data structure store 120 is also asynchronous and does not interfere with or block the step of the server instance 116 sending the queries 148 to the camera 128. The server instance 112 retrieves the results 156 from the in-memory data structure store 120 and sends them to the user device 124 for viewing by a user.

Figure 12:
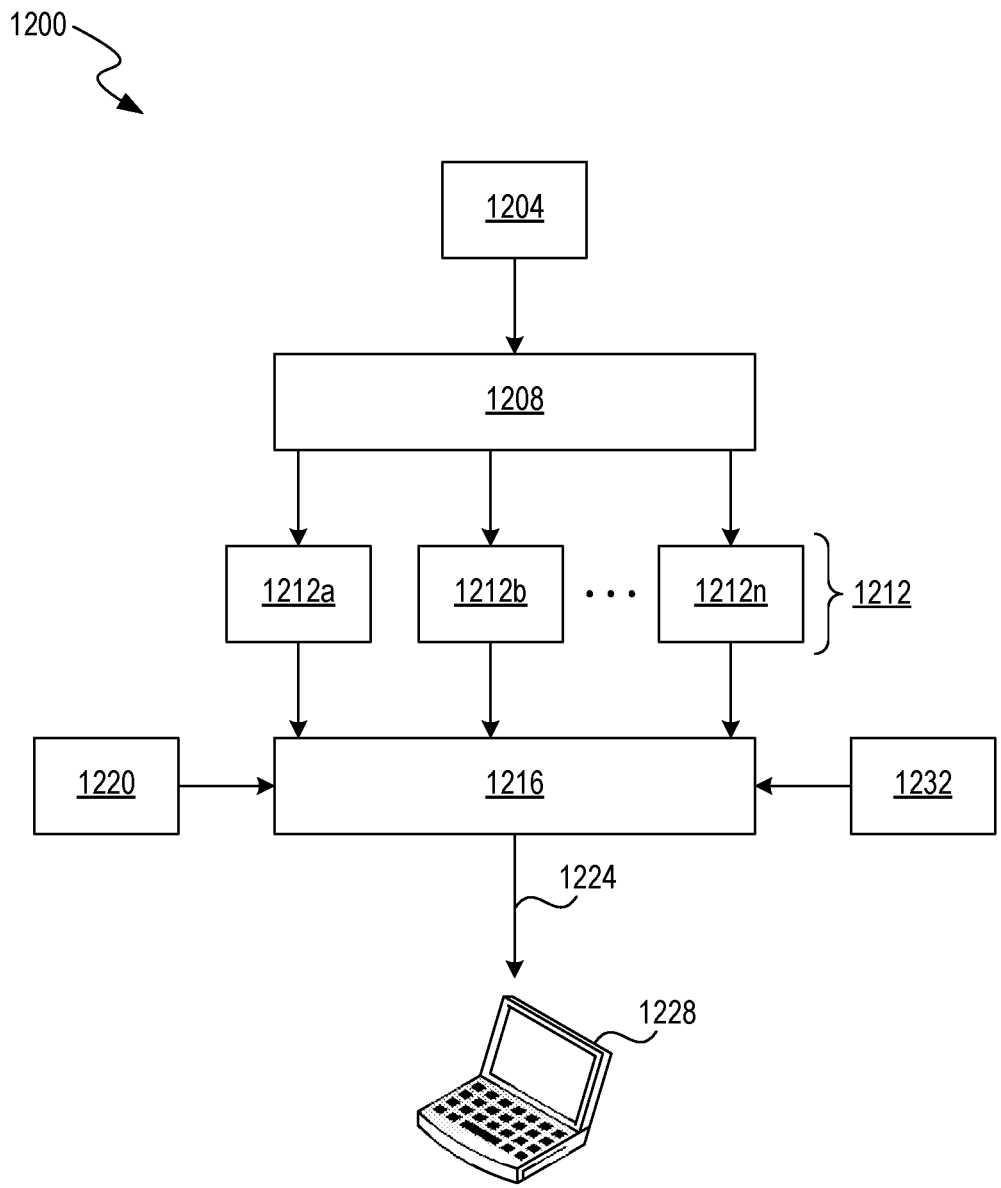
FIG. 12 is a block diagram illustrating an example machine learning system for people and vehicle analytics on the edge, in accordance with one or more embodiments.

FIG. 12 is a block diagram illustrating an example machine learning (ML) system 1200 for people and vehicle analytics on the edge, in accordance with one or more embodiments. The ML system 1200 is implemented using components of the example computer system 1300 illustrated and described in more detail with reference to FIG. 13. For example, the ML system 1200 can be implemented on the camera 128 using instructions programmed in a memory of the camera 128 illustrated and described in more detail with reference to FIG. 1. Likewise, embodiments of the ML system 1200 can include different and/or additional components or be connected in different ways. The ML system 1200 is sometimes referred to as an ML module.

The ML system 1200 includes a feature extraction module 1208 implemented using components of the example computer system 1300 illustrated and described in more detail with reference to FIG. 13. In some embodiments, the feature extraction module 1208 extracts a feature vector 1212 from input data 1204. For example, the input data 1204 can include images, features, frames, or metadata from a camera. The feature vector 1212 includes features 1212a, 1212b, . . . , 1212n. The feature extraction module 1208 reduces the redundancy in the input data 1204, e.g., repetitive data values, to transform the input data 1204 into the reduced set of features 1212, e.g., features 1212a, 1212b, . . . , 1212n. The feature vector 1212 contains the relevant information from the input data 1204, such that events or data value thresholds of interest can be identified by the ML model 1216 by using this reduced representation. In some example embodiments, the following dimensionality reduction techniques are used by the feature extraction module 1208: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 1216 performs deep learning (also known as deep structured learning or hierarchical learning) directly on the input data 1204 to learn data representations, as opposed to using task-specific algorithms. In deep learning, no explicit feature extraction is performed; the features 1212 are implicitly extracted by the ML system 1200. For example, the ML model 1216 can use a cascade of multiple layers of nonlinear processing units for implicit feature extraction and transformation. Each successive layer uses the output from the previous layer as input. The ML model 1216 can thus learn in supervised (e.g., classification) and/or unsupervised (e.g., pattern analysis) modes. The ML model 1216 can learn multiple levels of representations that correspond to different levels of abstraction, wherein the different levels form a hierarchy of concepts. In this manner, the ML model 1216 can be configured to differentiate features of interest from background features.

In alternative example embodiments, the ML model 1216, e.g., in the form of a CNN, generates the output 1224, without the need for feature extraction, directly from the input data 1204. The output 1224 is provided to the user device 1228, the computer vision processor 108, the server 132, the API running on server instance 116, or the user device 124 illustrated and described in more detail with reference to FIG. 1. In some embodiments, the steps performed by the ML system 1200 are stored in memory on the camera 128 for execution. In other embodiments, the output 1224 is displayed on the video display 1318 illustrated and described in more detail with reference to FIG. 13.

A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 1216 can be a CNN that includes both convolutional layers and max pooling layers. The architecture of the ML model 1216 can be "fully convolutional," which means that variable sized sensor data vectors can be fed into it. For all convolutional layers, the ML model 1216 can specify a kernel size, a stride of the convolution, and an amount of zero padding applied to the input of that layer. For the pooling layers, the model 1216 can specify the kernel size and stride of the pooling.

In some embodiments, the ML system 1200 trains the ML model 1216, based on the training data 1220, to correlate the feature vector 1212 to expected outputs in the training data 1220. As part of the training of the ML model 1216, the ML system 1200 forms a training set of features and training labels by identifying a positive training set of features that have been determined to have a desired property in question, and, in some embodiments, forms a negative training set of features that lack the property in question.

The ML system 1200 applies ML techniques to train the ML model 1216, that when applied to the feature vector 1212, outputs indications of whether the feature vector 1212 has an associated desired property or properties, such as a probability that the feature vector 1212 has a particular Boolean property, or an estimated value of a scalar property. The ML system 1200 can further apply dimensionality reduction (e.g., via linear discriminant analysis (LDA), PCA, or the like) to reduce the amount of data in the feature vector 1212 to a smaller, more representative set of data.

The ML system 1200 can use supervised ML to train the ML model 1216, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 1232 is formed of additional features, other than those in the training data 1220, which have already been determined to have or to lack the property in question. The ML system 1200 applies the trained ML model 1216 to the features of the validation set 1232 to quantify the accuracy of the ML model 1216. Common metrics applied in accuracy measurement include: Precision and Recall, where Precision refers to a number of results the ML model 1216 correctly predicted out of the total it predicted, and Recall is a number of results the ML model 1216 correctly predicted out of the total number of features that had the desired property in question. In some embodiments, the ML system 1200 iteratively re-trains the ML model 1216 until the occurrence of a stopping condition, such as the accuracy measurement indication that the ML model 1216 is sufficiently accurate, or a number of training rounds having taken place.

Figure 13:
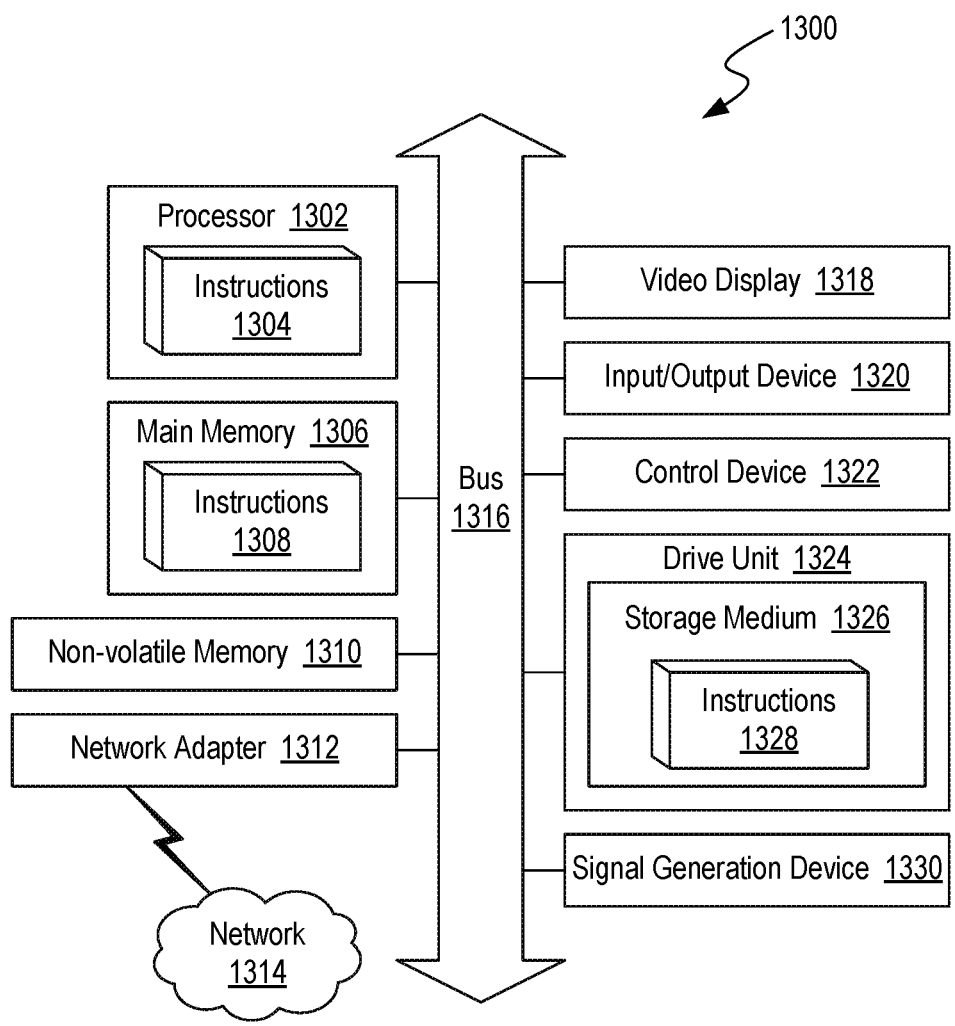
FIG. 13 is a block diagram illustrating an example computer system for people and vehicle analytics on the edge, in accordance with one or more embodiments.

FIG. 13 is a block diagram illustrating an example computer system 1300 for people and vehicle analytics on the edge, in accordance with one or more embodiments. Components of the example computer system 1300 can be used to implement the camera 128, the server 132, or the user device 124 illustrated and described in more detail with reference to FIG. 1. In some embodiments, components of the example computer system 1300 are used to implement the ML system 1200 illustrated and described in more detail with reference to FIG. 12. At least some operations described herein can be implemented on the computer system 1300.

The computer system 1300 can include one or more central processing units ("processors") 1302, main memory 1306, non-volatile memory 1310, network adapters 1312 (e.g., network interface), video displays 1318, input/output devices 1320, control devices 1322 (e.g., keyboard and pointing devices), drive units 1324 including a storage medium 1326, and a signal generation device 1330 that are communicatively connected to a bus 1316. The bus 1316 is illustrated as an abstraction that represents one or more physical buses and/or point-to-point connections that are connected by appropriate bridges, adapters, or controllers. The bus 1316, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

The computer system 1300 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 1300.

While the main memory 1306, non-volatile memory 1310, and storage medium 1326 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1328. The term "machine-readable medium" and "storage medium" should also be taken to include any medium that is capable of storing, encoding, or carrying a set of instructions for execution by the computer system 1300.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1304, 1308, 1328) set at various times in various memory and storage devices in a computer device. When read and executed by the one or more processors 1302, the instruction(s) cause the computer system 1300 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1310, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 1312 enables the computer system 1300 to mediate data in a network 1314 with an entity that is external to the computer system 1300 through any communication protocol supported by the computer system 1300 and the external entity. The network adapter 1312 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 1312 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application, and the circumstances under which the permission rights stand.

In additional embodiments, a computer vision processor of a camera generates tracks of a person or vehicle from hyperzooms depicting the person or vehicle, the hyperzooms generated from image frames captured by the camera. The computer vision processor receives coordinates of a line from a server instance over a full-duplex communication channel. The coordinates of the line are defined by a user device communicably coupled to the server instance. The computer vision processor defines a first parallel line and a second parallel line spaced from the line and positioned on different sides of the line. The computer vision processor determines a first position of the person or vehicle relative to the line from the tracks. The camera captures an image frame of the person or vehicle, the image frame captured after the image frames. The computer vision processor determines a second position of the person or vehicle relative to the line from the image frame captured after the image frames. The computer vision processor determines that the person or vehicle has crossed the line from a first side of the first parallel line to a second side of the second parallel line based on a difference between the first position and the second position. Responsive to determining that a first distance between the second position and the second parallel line is smaller than a second distance between the second position and the line, the computer vision processor stores metadata describing that the person or vehicle has crossed the line in a key-value database located on a memory card of the camera. The camera receives a query from the server instance over the full-duplex communication channel. The query requests a count of a number of times the person or vehicle has crossed the line. The computer vision processor generates a response to the query from the metadata stored in the key-value database. The camera sends the response to the server instance over the full-duplex communication channel. The response is for sending to the user device by the server instance.

The functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms can on occasion be used interchangeably.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications can be implemented by those skilled in the art.

We claim:

1. A computer vision method performed by a camera, the method comprising:
    determining bounding boxes from hyperzooms corresponding to an object, wherein the hyperzooms are generated from image frames captured by a camera;
    generating bounding box coordinates corresponding to the bounding boxes;
    determining, based on the bounding box coordinates, centroid coordinates corresponding to the object;
    receiving, from a first device, line coordinates defining a line;
    based on the centroid coordinates and the line coordinates, detecting crossings of the line by the object;
    receiving a query from a server instance, wherein the query requests a count of a number of times that the object crossed the line; and
    generating a response to the query based on detecting the crossings, wherein the response comprises the number of times that the object crossed the line.

2. The method of claim 1, comprising:
    determining, from a first hyperzoom of the hyperzooms, a first position of the object relative to the line;
    determining, from a second hyperzoom of the hyperzooms, a second position of the object relative to the line; and
    based on the line coordinates, determining that the line is between the first position and the second position.

3. The method of claim 2, comprising:
    based on a difference between the first position and the second position, determining that the object crossed from a first side of a first parallel line to a second side of a second parallel line,
    wherein the first parallel line and the second parallel line are parallel to the line, and
    wherein the line is between the first parallel line and the second parallel line.

4. The method of claim 1, comprising:
    determining mid-points of edges of the bounding box coordinates;
    generating track metadata associated with the object based on the mid-points; and
    storing the associated track metadata in a key-value database located on a storage medium of the camera.

5. The method of claim 4, wherein the key-value database stores the associated track metadata in a relational database management system (RDBMS).

6. The method of claim 1, comprising:
    receiving the line coordinates from the server instance over a full-duplex communication channel, wherein the server instance is communicably coupled to the device.

7. The method of claim 1, comprising:
    generating a unique identifier for the object, wherein the response to the query includes the unique identifier.

8. A system comprising:
    one or more computer processors; and
    a non-transitory, computer-readable storage medium storing computer instructions, which when executed by the one or more computer processors cause the one or more computer processors to:
        determine bounding boxes from hyperzooms corresponding to an object, wherein the hyperzooms are generated from image frames captured by a camera;
        generate bounding box coordinates corresponding to the bounding boxes;
        determine, based on the bounding box coordinates, centroid coordinates corresponding to the object;
        receive, from a first device, line coordinates defining a line;
        based on the centroid coordinates and the line coordinates, detect crossings of the line by the object;
        receive a query from a server instance, wherein the query requests a count of a number of times that the object crossed the line; and
        generate a response to the query based on detecting the crossings, wherein the response comprises the number of times that the object crossed the line.

9. The system of claim 8, wherein the computer instructions cause the one or more computer processors to:
    determine, from a first hyperzoom of the hyperzooms, a first position of the object relative to the line;
    determine, from a second hyperzoom of the hyperzooms, a second position of the object relative to the line; and
    based on the line coordinates, determine that the line is between the first position and the second position.

10. The system of claim 9, wherein the computer instructions cause the one or more computer processors to:
    based on a difference between the first position and the second position, determine that the object crossed from a first side of a first parallel line to a second side of a second parallel line,
    wherein the first parallel line and the second parallel line are parallel to the line, and
    wherein the line is between the first parallel line and the second parallel line.

11. The system of claim 8, wherein the computer instructions cause the one or more computer processors to:
    determine mid-points of edges of the bounding box coordinates;

generate track metadata associated with the object based on the mid-points; and store the associated track metadata in a key-value database located on a storage medium of the camera.

12. The system of claim 11, wherein the key-value database stores the associated track metadata in a relational database management system (RDBMS).

13. The system of claim 8, wherein the computer instructions cause the one or more computer processors to:

receive the line coordinates from the server instance over a full-duplex communication channel, wherein the server instance is communicably coupled to the device.

14. The system of claim 8, wherein the computer instructions cause the one or more computer processors to:

generate a unique identifier for the object, wherein the response to the query includes the unique identifier.

15. A non-transitory, computer-readable storage medium storing computer instructions, which when executed by one or more computer processors, cause the one or more computer processors to:

determine bounding boxes from hyperzooms corresponding to an object, wherein the hyperzooms are generated from image frames captured by a camera;

generate bounding box coordinates corresponding to the bounding boxes;

determine, based on the bounding box coordinates, centroid coordinates corresponding to the object;

receive, from a first device, line coordinates defining a line;

based on the centroid coordinates and the line coordinates, detect crossings of the line by the object;

receive a query from a server instance, wherein the query requests a count of a number of times that the object crossed the line; and generate a response to the query based on detecting the crossings, wherein the response comprises the number of times that the object crossed the line.

16. The non-transitory, computer-readable storage medium of claim 15, wherein the computer instructions cause the one or more computer processors to:

determine, from a first hyperzoom of the hyperzooms, a first position of the object relative to the line;

determine, from a second hyperzoom of the hyperzooms, a second position of the object relative to the line; and based on the line coordinates, determine that the line is between the first position and the second position.

17. The non-transitory, computer-readable storage medium of claim 16, wherein the computer instructions cause the one or more computer processors to:

based on a difference between the first position and the second position, determine that the object crossed from a first side of a first parallel line to a second side of a second parallel line, wherein the first parallel line and the second parallel line are parallel to the line, and wherein the line is between the first parallel line and the second parallel line.

18. The non-transitory, computer-readable storage medium of claim 15, wherein the computer instructions cause the one or more computer processors to:

determine mid-points of edges of the bounding box coordinates;

generate track metadata associated with the object based on the mid-points; and store the associated track metadata in a key-value database located on a storage medium of the camera.

19. The non-transitory, computer-readable storage medium of claim 18, wherein the key-value database stores the associated track metadata in a relational database management system (RDBMS).

20. The non-transitory, computer-readable storage medium of claim 15, wherein the computer instructions cause the one or more computer processors to:

receive the line coordinates from the server instance over a full-duplex communication channel, wherein the server instance is communicably coupled to the device.

* * * * *